United States Patent
Koyanagi et al.

(10) Patent No.: US 6,690,548 B2
(45) Date of Patent: Feb. 10, 2004

(54) RAMP FOR USE IN INFORMATION RECORDING DISK APPARATUS, AND INFORMATION RECORDING DISK APPARATUS

(75) Inventors: Ichiroh Koyanagi, Fujisawa (JP); Yuhji Kobayashi, Fujisawa (JP); Tsai-Wei Wu, Fujisawa (JP); Tetsuo Ishikawa, Nihonmatsu (JP)

(73) Assignees: International Business Machines Corporation, Armonk, NY (US); Nok Corporation, Tokyo (JP)

( * ) Notice: Subject to any disclaimer, the term of this patent is extended or adjusted under 35 U.S.C. 154(b) by 193 days.

(21) Appl. No.: 09/974,687

(22) Filed: Oct. 10, 2001

(65) Prior Publication Data

US 2002/0044386 A1 Apr. 18, 2002

(30) Foreign Application Priority Data

Oct. 13, 2000 (JP) .......... 2000-312848

(51) Int. Cl.$^7$ .......... G11B 21/22; G11B 5/54
(52) U.S. Cl. .......... 360/254.8
(58) Field of Search .......... 360/254.8, 254.7, 360/255.6, 255.7, 254.4, 255.3, 254.2, 254, 250, 240, 97.02

(56) References Cited

U.S. PATENT DOCUMENTS

| | | | |
|---|---|---|---|
| 6,078,474 A | 6/2000 | Koyanagi et al. | 360/254.8 |
| 6,160,686 A * | 12/2000 | Albrecht et al. | 360/255.6 |
| 6,275,356 B1 * | 8/2001 | Boutaghou et al. | 360/254.8 |
| 6,424,501 B1 * | 7/2002 | Tsujino et al. | 360/254.7 |
| 6,487,051 B1 * | 11/2002 | Koyanagi et al. | 360/254.8 |

* cited by examiner

Primary Examiner—Hoa T. Nguyen
Assistant Examiner—Julie Anne Watko
(74) Attorney, Agent, or Firm—Akin, Gump, Strauss, Hauer & Feld, LLP.

(57) ABSTRACT

A ramp wherein the amount of deformation in the front end edges of guiding parts caused by thermal expansion. The ramp includes at least two guiding parts individually formed for each suspension arm and made of a polymeric material having a small friction coefficient for guiding the suspension arm by sliding into a accommodation zone, and a guide supporting member made of a material having a thermal expansion coefficient smaller than that of the polymeric material of the guiding part for supporting each guiding part at a predetermined position. The guide supporting member has guide support holes which are located in zones to be contacted with the associated guiding parts, are not contacted with associated recording disks, and are engaged with the associated guiding parts at such positions that distances to the front end edges of the guiding parts become shortest. Each of the guiding parts has a projection. When the projection is engaged in the associated guide support hole, the guiding part guides the suspension arm at a suitable position.

7 Claims, 14 Drawing Sheets

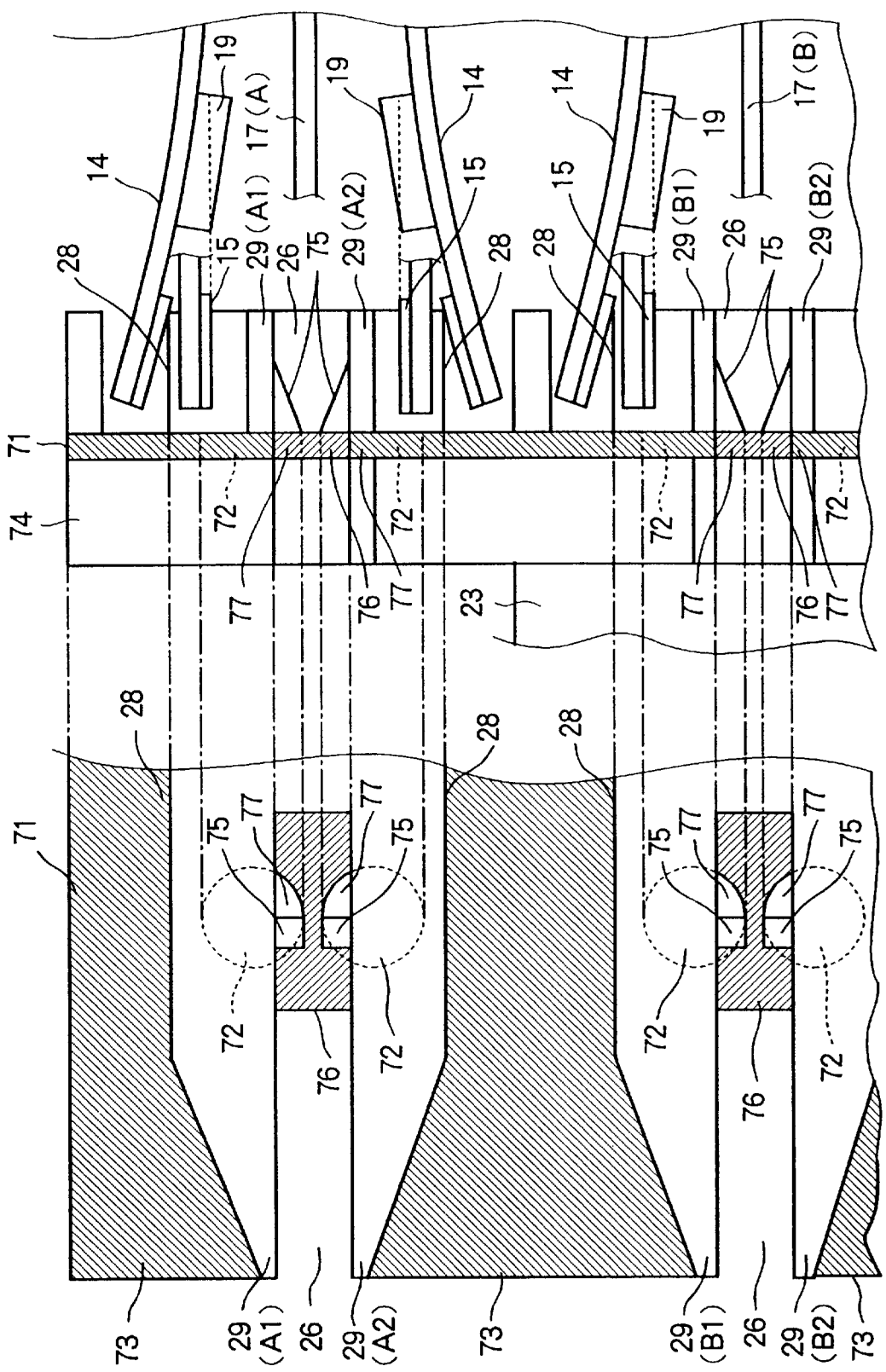

PRIOR ART

RAMP FOR USE IN INFORMATION RECORDING DISK APPARATUS, AND INFORMATION RECORDING DISK APPARATUS

BACKGROUND OF THE INVENTION

The present invention relates to a ramp mechanism for holding a suspension arm which holds a head for reading and writing of information from and to an information recording disk rotating at a high speed in an information recording disk apparatus in such a state as spaced from the disk when the disk is in its inoperable mode.

Among information recording apparatuses for use with an information processing apparatus such as a computer, a hard disk drive unit as an information recording disk apparatus, which uses a magnetic recording disk rotating at a high speed as a recording medium, rotates a plurality of magnetic recording disks (which will be referred merely to as recording disks, hereinafter) at a high speed, writes or reads information to or from each recording disk by means of magnetic heads provided as associated with upper and lower surfaces of each disk.

The magnetic head for use with the hard disk drive apparatus, which is supported to a suspension arm or the like driven by an actuator, moves on the recording disk at a high speed. Further, the magnetic head and recording disk are not contacted with each other, and the action of an airflow generated by rotation of the recording disk causes the magnetic head to float the recording disk over with a very small gap therebetween.

When the recording disk is not rotated with respect to the magnetic head, it is required for the magnetic head not to be brought into contact with the recording disk. This is because a long-time contact of the magnetic head with the recording disk not being rotated may undesirably result in the fact that the head to stick to the surface of the disk. In such a case, start of the rotation of the recording disk causes the head-stuck surface of the disk to peel off, thus resulting in a damage of the surface of the disk.

Even when the surface contact time between the magnetic head and recording disk is too short to cause such a sticking phenomenon as mentioned above, it is required that the head not be contacted with the disk. This is for the purpose of avoid such a situation as will be explained below. That is, for example, after the magnetic head came into contact with the recording disk being stopped in rotation, if the disk starts its rotation and reaches to a predetermined rotational speed, then a contact friction between the head and disk during that contact period may cause the surface of the disk to be scraped. In order that the magnetic head flies over the surface of the recording disk, it is generally required that the disk reach a predetermined rotational speed.

As mentioned above, so long as the recording disk does not reach the predetermined rotational speed, the head must be spaced from the disk. To realize this, there has been known in these years a mechanism for holding a magnetic head called a ramp which holds a magnetic head and a suspension arm relative to a recording disk with a gap spaced therefrom when the rotational speed of the recording disk is below the predetermined level.

In a recent hard disk drive apparatus, there is provided a ramp as a magnetic-head retraction location where the head is held as spaced from a recording disk when the disk stops its rotation or while it is rotating at a low speed. In such a hard disk drive apparatus, when the rotational speed of the recording disk is decreased to such a level that the head cannot float the disk over, the apparatus unloads the head; whereas, when the rotational speed is increased to such a level as to enough to float the head over, the apparatus loads the head onto the disk. Such a system of unloading and loading the head to and from the ramp as mentioned above is known as a ramp loading system.

The ramp is made of polymeric material, molded and manufactured. The ramp is fixed to a housing of the hard disk apparatus by means of screw, and is subjected to a stress in a compression direction when the ramp is pushed against the housing by a tightening torque of the screw. Accordingly after passage of a long period of time, the ramp made of the polymeric material is susceptible to a creep deformation as a plastic deformation.

Further, for the purpose of rotating the recording disk at a high speed, a motor, a driver circuit therefor, and so on are built in the information recording disk apparatus. Heat evolution of the motor, driver circuits, etc. will cause the internal temperature of the disk apparatus to inevitably increase. Thus even the ambient temperature of the ramp increases during the high-speed rotation of the disk, and decreases therefrom during rotation stoppage of the disk and approaches normal temperature. In other words, the ramp is used in a environment of temperature cycling. In this case, the creep deformation takes place more easily with time passage, as will be clear from the fact that, in a reliability test field for example, time is accelerated with temperature cycle.

FIG. 11(a) is a perspective view of a conventional ramp when all parts of the ramp are made of polymeric material containing polytetrafluoroethylene (PTFE) and are integrally molded. FIG. 11(b) is a enlarged perspective view of a front end edge part of a guide section for guiding a suspension arm in the ramp of FIG. 11(a). In FIGS. 11(a) and 11(b), the ramp is of a type wherein the suspension arms are held when three stages of recording disks for both side use are stacked.

As shown in FIG. 11(a), a conventional ramp 20 includes a mount 21 having a screw pit 25 therein for fixing of the ramp 20 to a housing of an information recording disk apparatus with a screw, and also includes an arm holder 22. The arm holder 22 has accommodation zones 27 in which a slider having a magnetic head mounted thereto for writing or reading to or from a recording disk is held as spaced from the associated one of the recording disks, and also has guiding parts 28 for facilitating access of the suspension arm to the accommodation zones 27 by sliding associated lifting projection.

The mount 21 and arm holder 22 are integrally molded by once injection molding operation with use of polymeric material containing the PTFE. A metal sleeve 30, which is inserted into the screw pit 25 and then molded, acts to less transmit a stress accumulated in the vicinity of the screw pit 25 at the time of tightening the screw to the polymeric material part.

The mount 21 is made up of the screw pit 25, the metal sleeve 30, and a bracket 23 provided therearound.

The arm holder 22 is supported by the accommodation zones 27 for storage of the lifting projections of the suspension arm associated with upper and lower surfaces of each recording disk, the guiding parts 28, and a support 24 so that the accommodation zones 27 and guiding parts 28 are aligned in a disk stacking direction.

The accommodation zones 27 and guiding parts 28 are provided not only at upper surface sides shown in FIG. 11(a)

but also even at lower sides of horizontally-symmetrical surfaces of each disk. A part of a peripheral edge of each disk is entered into associated one of openings 26. In other words, a front end edge 29 of each guiding part 28 and each disk within the openings 26 have a positional relationship that the edge and disk are located within the opening in a non-contact condition. The ramp 20 is fixed to the housing by means of a screw so as to satisfy the above positional relationship. As an actuator assembly is rotated in a direction away from the recording disk, the lifting projection mounted to the suspension arm is raised in the vicinity of the front end edge 29 of the associated guiding part 28, so that the arm is slid along the guiding parts 28 and stored into the associated accommodation zone 27. Further, as the actuator assembly is rotated in a direction opposed to the above direction, the lifting projection comes out of the accommodation zone 27, slides along the guiding part 28, and then released from the front end edge 29 of the guiding part 28 onto the disk.

In the case where the ramp 20 shown in FIG. 11(a) is fixed to the housing of the information recording disk apparatus by means of the screw, tightening of the screw causes a stress to be accumulated in the vicinity of the screw pit 25 in the mount 21. For the purpose of lightening the tightening stress of the screw, the metal sleeve 30 is used. However, even when the metal sleeve 30 is used, injection molding is carried out at the time of molding the ramp 20 under a condition that the sleeve 30 is placed within a mold at a controlled predetermined high temperature. For this reason, a stress (thermal stress) based on a temperature difference upon the molding is accumulated in the vicinity of the metal sleeve 30 in the ramp 20. In particular, when the mold temperature is once increased to a temperature of 80 to 90° C. close to an upper limit of usable temperatures of the hard disk drive apparatus and then returns to room temperature upon the molding, the thermal stress, similarly to the screw tightening stress, will cause the front end edge 29 of the guiding part 28 to be deformed.

The stress irreversibly deforms the periphery of the ramp 20 with time passage or after the ramp is once increased to a high temperature, which involves dimensional misalignment of parts of the ramp 20. That is, the stress caused by fixing the ramp 20 by means of the screw will involve a creep deformation. The creep deformation is remarkable and problematic in the ramp 20, in particular, in the screw pit 25 and the front end edge 29 of the guiding part 28.

Further, in order that the front end edge 29 of the guiding part 28 smoothly guides the suspension arm 14 on the recording disk rotating at a high speed into the associated accommodation zone 27 or conversely smoothly guides the suspension arm 14 (especially, lifting projection 15) accommodated in the associated accommodation zone 27 onto the recording disk rotating at a high speed, it is required that the front end edge 29 of the guiding part 28 be located in such a position as not to be contacted with the recording disk and not to be spaced therefrom too much. That is, the front end edge 29 of the guiding part 28 is required to be positioned in a predetermined distance range with respect to the recording disk. For this reason, the guiding part 28 must be located at a position suitable for guidance of the suspension arm 14.

When creep deformation takes place in the vicinity of the screw pit 25 of the mount 21, however, its influence causes deformation of the guiding part 28 and the front end edge 29 of the guiding part 28 as mentioned in connection with FIG. 11(b), with the result that the front end edge 29 cannot be within the predetermined distance range with respect to the recording disk. As a result, the ramp 20 and recording disk are easily brought into contact by an external shock, thus disadvantageously resulting in generation of polymer particles.

Explanation will next be made in connection with a case where the front end edge 29 of the guiding part 28 becomes out of the predetermined distance range with respect to the recording disk 17, with reference to drawings.

FIG. 12 is a sectional view of the ramp 20, suspension arm and recording disk of FIG. 11(a) showing a positional relationship thereamong. In FIG. 12, the ramp 20 is fixed to the housing 11 of the information recording disk apparatus by means of a screw 31. Also illustrated in FIG. 12 are three recording disks 17(A), 17(B) and 17(C) arranged as extended into the ramp 20 in a non-contacted relationship therewith as well as the suspension arms 14 as spaced from the associated recording disks 17 by the associated guiding part 28. Although members in FIG. 12 are illustrated with spaces therebetween for the purpose or easy distinction therebetween, the lower surface of the bracket 23 may be brought into contact with the lower surface of the support 2 as an example so that the ramp 20 is supported by the housing 11.

That the front end edge 29 of the guiding part 28 is located to be out of the predetermined distance range with respect to the recording disk may sometimes mean that distances L1up and L1down between the upper and lower surfaces of the recording disk and associated cutout parts of the ramp 20 are not equal to each other. And when one of the distances L1up and L1down becomes too much small, an external shock applied to the hard disk drive apparatus in operation may cause easy contact between the recording disk 17 and ramp 20, which possibly causes a harm in the reading and writing of magnetic record.

Since the distances L1up and L1down become not equal to each other, loading and unloading positions of the sliders (heads) on the same recording disk, which are installed on the upper and lower surfaces thereof, are shifted remarkably. An recordable area on the recording disk is determined by one of the heads having larger one of distances L2. That is, when the loading and unloading positions of the sliders (heads) on the recording disk are moved in an inner peripheral direction of the disk, the recordable area on the disk is decreased. Thus for the same recording density, the overall capacity is disadvantageously decreased.

In an extreme example of the actual hard disk drive apparatuses, a movement of the front end edge 29 of the guiding part 28 may cause recorded date not to be able to be read out therefrom.

In FIG. 12, both the lifting projection 15 at a position raised by the guiding part 28 and the lifting projection 15 positioned on the recording disk 17 are illustrated for convenience of explanation.

A disadvantage that the front end edge 29 of the guiding part 28 becomes out of the predetermined distance range with respect to the recording disk 17, tends to occur when the recording disk 17 is rotating at a high speed, that is, when the interior temperature of the information recording disk apparatus is high. This is considered to be caused by the reason which follows. That is, the polymeric material has a thermal expansion coefficient as large as several to several tens of times the thermal expansion coefficient of a metallic material. Thus when the front end edge 29 of the guiding part 28 in the ramp 20 having the recording disk 17 rotating at a high speed is deformed due to the thermal expansion, the influence of the aforementioned thermal stress or screw tightening stress will change its deforming direction.

The more the number of such recording disks 17 stacked within the information recording disk apparatus 10 is increased, the more easily the disadvantage of the front end edge 29 of the guiding part 28 going out of the predetermined distance range with respect to the recording disk 17 takes place. The reason of this disadvantage is explained as follows. As the number of recording disks increases, the dimension of the ramp 20 in a direction overlapped with a plurality of recording disks is increased. For example, when six of the front end edges 29 in FIG. 12 are denoted by reference symbols A1, A2, B1, B2, C1 and C2 sequentially from the upper side of the magnetic recording disk apparatus toward the lower side of the apparatus contacted with the housing 11, a distance L3 between the front end edge 29 (C2) of the guiding part 28 associated with the lower surface of the lowermost disk C and the front end edge 29 (A1) of the guiding part 28 associated with the upper surface of the uppermost disk A is increased, and the amounts of the front end edges 29 (A1), 29(A2), 29(B1), 29(B2), 29(C1) and 29(C2) of the guiding parts 28 deformed by the thermal expansion will be correspondingly increased.

FIG. 13 is a diagram showing a relationship between the temperature and deformation of the front end edge 29 of the guiding part 28 in the conventional ramp of FIGS. 11 and 12.

In FIG. 13, the deformed amounts of the six front end edges 29(A1), 29(A2), 29(B1), 29(B2), 29(C1) and 29(C2) in FIG. 12 were measured.

As shown in FIG. 13, when a change (a differential dimension ΔL based on the deformation of the distance L3 in FIG. 12) in an interval between a front end edge A1 and a front end edge C2 is about 85 μm for 100° C. The larger the number of such recording disks 17 laminated in the information recording disk apparatus is, the larger the interval value is as mentioned above, which becomes a serious problem.

In the prior art, the deformation direction of the front end edge 29 of the guiding part 28 has been considered to be only a P direction. For this reason, there has been considered a method for suppressing the deformation amount of the front end edge 29 in the P direction by making a junction hole in a metallic plate (stainless plate) having a small thermal expansion coefficient at a given position, blanking it into such a shape as to be accommodated within the support 24 and inserting it into the support 24.

FIG. 14 is a diagram showing a relationship between the amount of deformation in the front end edge 29 of the guiding part 28 in the conventional ramp and the temperature thereof, when the number of recording disks is six that is twice that of the prior art example of FIGS. 11 to 13 and when the metallic plate is inserted into the support 24.

In FIG. 14, as in FIG. 13, the amounts of deformation in the front end edges 29 (A1, A2, B1, B2, C1, C2, D1, D2, E1, E2, F1 and F2) of the twelve guiding parts 28 corresponding to a total number of upper and lower sides of six recording disks were measured with respect to changes in the ambient temperature. Further, it was assumed that L6 denotes a length of an interval between the front end edges 29 (A1 and A2) of the guiding parts 28 corresponding to the upper and lower sides of the first recording disk A, L7 denotes a length of an interval between the front end edges 29 (B1 and B2) corresponding to the upper and lower sides of the second recording disk B, L8 denotes a length of an interval between the front end edges 29 (C1 and C2) corresponding to the upper and lower sides of the third recording disk C, L9 denotes a length of an interval between the front end edges 29 (D1 and D2) corresponding to the upper and lower sides of the fourth recording disk D, L10 denotes a length of an interval between the front end edges 29 (E1 and E2) corresponding to the upper and lower sides of the fifth recording disk E, and L11 denotes a length of an interval between the front end edges 29 (F1 and F2) corresponding to the upper and lower sides of the sixth recording disk F.

As shown in FIG. 14, since the metallic plate is inserted into the support 24, a change (ΔL in the interval L6 between the front end edges A1 and F2) in the interval between the front end edges A1 and F2 is about 40 μm that is half or less of the change in FIG. 13 even for 100° C. That is, the deformation amount is decreased down to such a level as not to cause a problem with the entire ramp. However, a change in the interval L6 is about 35 μm, a change in the interval L7 is about 36 μm, a change in the interval L10 is about 35 μm and a change in the interval L11 is about 35 μm. Accordingly when such changes are viewed from each recording disk, the problem with the amount of deformation in the front end edge 29 of the guiding part 28 will not be decreased sufficiently down to such a level as to less cause a problem.

Further, for the purpose of suppressing the amount of deformation in the front end edge 29 of the guiding part 28, a mount is prepared by continuously molding two sorts of color polymeric materials having small thermal expansion coefficients (which will be referred to merely as 'two-color molding') different from the thermal expansion coefficient of an arm support to suppress the amount of deformation of the front end edge 29 in a P direction, as disclosed in Japanese Patent Application No. 2000-31985 by the same inventors as the present application.

However, it has been found from studies of the inventors of the present application that the front end edge 29 of the guiding part 28 is deformed in three directions, that is, not only the stacked direction (P direction) while keeping parallel to the plane of the recording disk but also a direction (Q direction) that the front end edge 29 momentarily opens and moves (curled up) away from the recording disk plane and a direction (R direction) the side end edge in the vicinity of the front end edge 29 momentarily opens and moves (curled up) away from the recording disk plane. Thus for the purpose of suppressing the deformation amount, it has been found that, in addition to taking a prior art measure against the P-direction deformation, it is required to take a measure against the deformations in the Q and R directions.

The deformation of the front end edge 29 in the Q or R direction is considered to caused from the deformation of a beam 40 in a Z direction shown in FIG. 11(b), in particular, by the thermal expansion of a beam 40 which is made of the same material as the guiding part 28 and which bridges two guiding parts 28 disposed back to back in the disks stacking direction.

In the case where the metallic plate is made of material having a small thermal expansion coefficient or is two-color molded, further, it is believed that, when an engagement position engaged between the guide made of material having a large thermal expansion coefficient and the metallic plate having a small thermal expansion is coefficient is moved away from the front end edge 29, a part of the guide corresponding to a moment arm is extended, thereby increasing the amount of deformation in the Q or R direction.

In addition, the momentary deformation, in particular, in the R direction is considered to be increased when the transversal width dimension of the front end edge 29 of the guiding part 28 corresponding to a moment arm is large.

SUMMARY OF THE INVENTION

It is therefore an object of the present invention to provide a ramp which can lighten or eliminate a cause of increasing the aforementioned deformation to thereby decrease the deformation of a front end edge of a guide caused by thermal expansion, in particular, not only the amount of deformation in a disk stacked direction but also the amounts of deformation in a direction in which the front end edge momentarily opens and in a direction in which a side end edge of the front end edge momentarily opens.

In accordance with an aspect of the present invention, the above object is attained by providing a ramp for use in an information recording disk apparatus wherein the amount of deformation in the front end edges of guiding parts caused by thermal expansion. The ramp includes at least two guiding parts individually formed for each suspension arm and made of a polymeric material having a small friction coefficient for guiding the suspension arm by sliding into a accommodation zone, and a guide supporting member made of a material having a thermal expansion coefficient smaller than that of the polymeric material of the guiding part for supporting each guiding part at a predetermined position. The guide supporting member has first engagement parts, the first engagement parts are located in zones to be contacted with the associated guiding parts and are not contacted with associated recording disks. The first engagement parts are engaged with the associated guiding parts at such positions that distances to the front end edges of the guiding parts become shortest, each of the guiding parts has a second engagement part, and when the second engagement part is engaged in the associated first engagement part, the guiding part guides the suspension arm at a suitable position.

In the ramp for use in the information recording disk apparatus, further, no bridging member made of the same material as the each guiding part for linking a support surface of each guiding part and a surface of the guiding part opposed thereto is provided at least between the front end edge of the each guiding part and the second engagement part.

In the ramp for use in the information recording disk apparatus, the front end edge of the guiding part is set to have such a minimum width that causes the suspension arm not to be brought into contact with the guide supporting members. The guide supporting member is engaged with the guiding part at such an angle that the suspension arm is not contacted therewith, or is made in the form of an arc so that the suspension arm is not contacted therewith and is engaged with the guiding part.

In the ramp for use in the information recording disk apparatus, the guide supporting member is made of a metallic plate and the second engagement part of the guiding part is provided with a anti-lean support part so that the opposing surfaces of each guiding part are not linked mutually.

In the ramp for use in the information recording disk apparatus, the guide supporting member is provided with a comb shape in a part other than escape parts of the recording disks, the comb being extended to the front end edges of the guiding parts.

In the ramp for use in the information recording disk apparatus, the guide supporting member is made of a polymeric material which has a thermal expansion coefficient smaller than that of a polymeric material of the guiding part.

In the ramp for use in the information recording disk apparatus, the guide supporting member has guide gaps of such a shape as to fill gaps between the guiding parts on their sides where the suspension arm is not slid.

In the ramp for use in the information recording disk apparatus, the first engagement part is provided in the guide supporting member corresponding to the guide gaps, and the second engagement part is provided to the guiding part at a position opposed to the first engagement part.

In the ramp for use in the information recording disk apparatus, the first and second engagement parts are of a hook type where the first and second engagement parts are combined into a hook.

In accordance with another aspect of the present invention, there is provided an information recording disk apparatus having the ramp as set forth in the above. The disk apparatus includes a rotary actuator assembly linked with a suspension arm, a plurality of laminated magnetic disks, the ramp disposed in the vicinity of the magnetic disks for retracting the suspension arm, and a housing in which the actuator assembly, magnetic disks and ramp are accommodated.

BRIEF DESCRIPTION OF THE DRAWINGS

In the attached drawings:

FIG. 6(a) is a enlarged side view of a part of the guiding parts including front end edge of the ramp of FIG. 5, and FIG. 6(b) is a front view of FIG. 6(a);

DESCRIPTION OF THE PREFERRED EMBODIMENTS

The present invention will be explained in connection with an illustrated embodiment.

Figure 1:
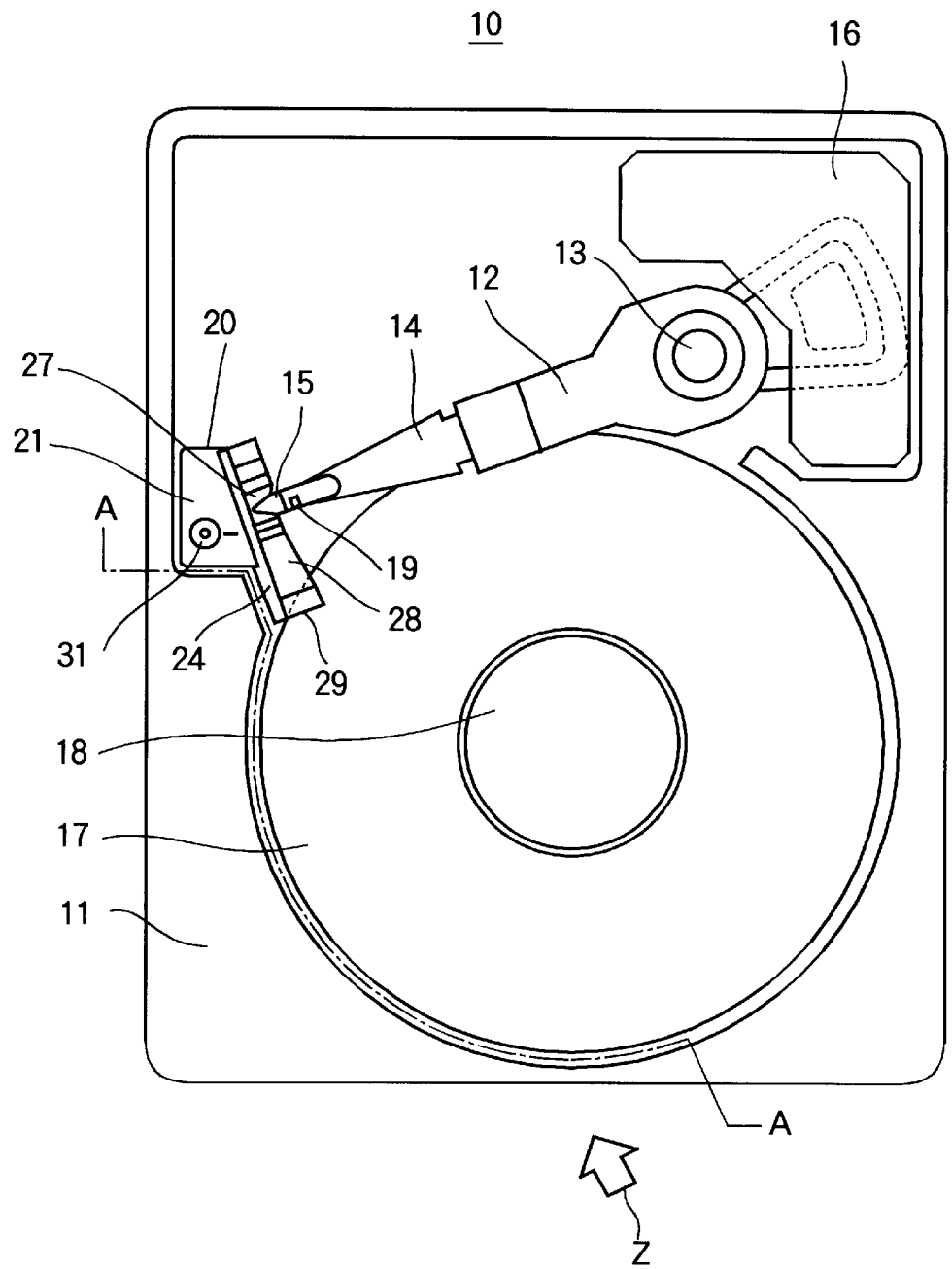
FIG. 1 is a plan view of a magnetic recording disk apparatus provided with a ramp in accordance with an embodiment of the present invention.

FIG. 1 is a plan view of a magnetic recording disk apparatus which is provided with a ramp in accordance with an embodiment of the present invention.

A magnetic recording disk apparatus 10 in FIG. 1 has a housing 11 which accommodates a plurality of recording disks 17, a rotary actuator assembly 12, a motor 16 and a ramp 20, and which also defines an airtight space therein. The plurality of recording disks 17, each having magnetic recording layers formed on its upper and lower surfaces, are stacked, fixed to a spindle shaft 18, and rotated together with the spindle shaft 18 by a spindle motor (not shown). The upper and lower surfaces of each recording disk 17 are used as information recording surfaces, and an exclusive magnetic head is provided for each surface. The actuator assembly 12 includes a plurality of stacked suspension arms 14 corresponding in number to the information recording surfaces which are supported by a pivot shaft 13. Mounted on each suspension arm 14 at its tip end is a slider 19 which has a magnetic head for scanning of the upper and lower information recording surfaces of each disk. The suspension arm 14 in turn is provided at its tip end with a lifting projection 15.

The actuator assembly 12 is rotated around the pivot shaft 13 by the voice coil motor 16 to load the slider 19 on the surface of the recording disk 17 or unload the slider 19 into the ramp 20. The suspension arm 14, which is made of elastic material, is forced in such a direction that the slider 19 mounted on the arm nears the surface of associated one of the recording disks 17. Since the rotation of the recording disk 17 causes a balance to be maintained between the levitation power of the slider 19 generated by the rotation of the recording disk 17 and the resilience of the suspension arm 14, so that the slider 19 keeps floating the surface of the recording disk 17 in rotation over with a constant distance spaced therefrom.

The ramp 20 is fixed to the housing 11 of the magnetic recording disk apparatus 10 by means of the screw 31 at such a position that the ramp is provided in the vicinity of the recording disk 17 and that the front end edges 29 of the guiding parts are arranged as extended into gaps between the recording disks 17 in an alternately non-contacted relationship therebetween. The ramp 20 includes a mount 21 for mounting of the ramp 20 to the housing 11, accommodation zones 27 for holding the associated suspension arms 14 as spaced from the associated recording disks 17, guiding parts 28 for sliding the associated suspension arms 14 holding the associated sliders 19, and a support 24 for supporting the guiding parts 28 and accommodation zones 27. Tip end of approaching part of the guiding part 28 when the suspension arm 14 is released from the guiding part 28 onto the recording disk 17 or when the suspension arm 14 is stored from a position on the recording disk 17 into the guiding part 28, is the front end edge 29. Each of the guiding parts 28 and accommodation zones 27 in the ramp 20 is provided for each of the suspension arms 14.

Figure 2B:
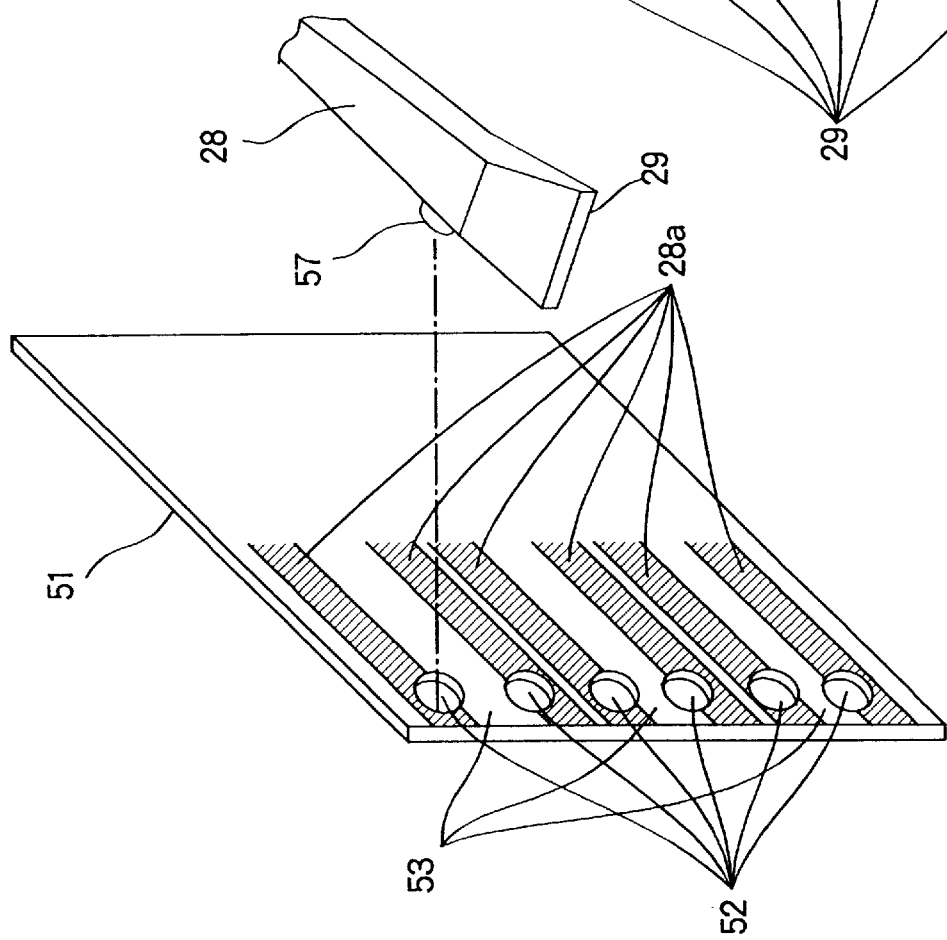
FIG. 2(b) is a perspective view of the guiding parts and guide supporting member of FIG. 2(a) when engaged with each other.
Figure 2A:
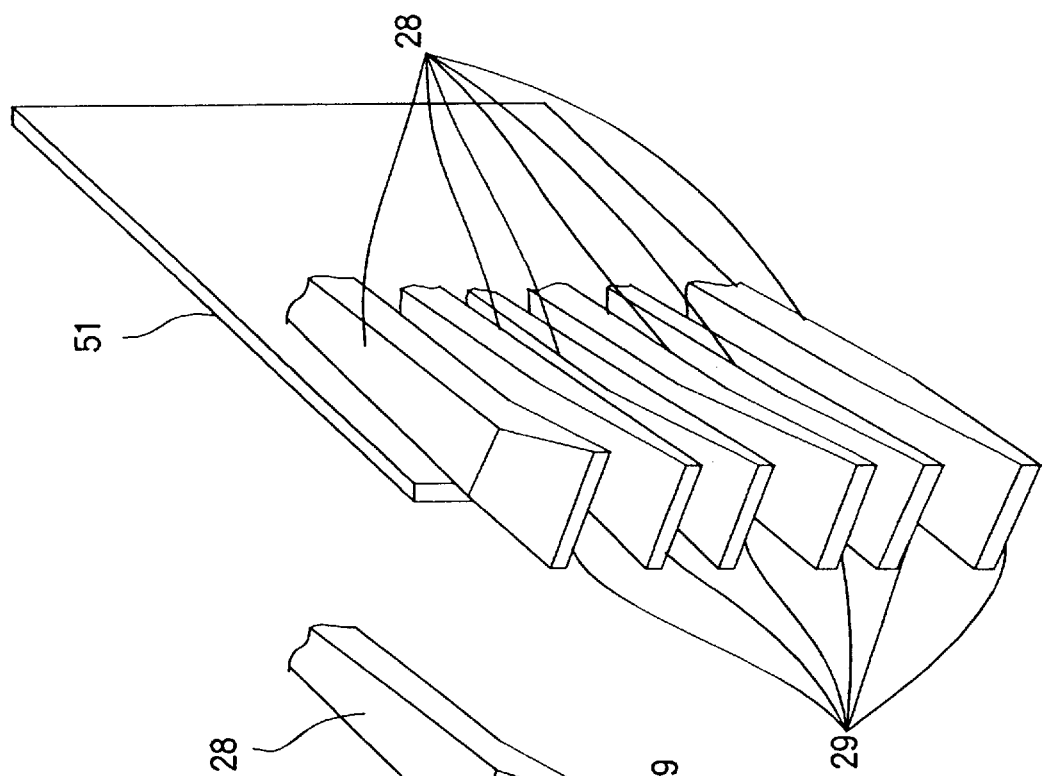
FIG. 2(a) is a perspective view of guiding parts and a guide supporting member in the ramp of the present invention, showing the design idea thereof.

FIGS. 2(a–b)show a perspective view of a design idea of guiding parts and a guide supporting member in the ramp of the present invention, wherein FIG. 2(a) shows the individual guiding parts and guide supporting member in the present invention and FIG. 2(b) shows a state of the guiding parts when engaged with the guide supporting member in the present invention. The ramp of the present invention shown in FIGS. 2(a) and 2(b) is of a type wherein double-sided recording disks using their double sides are stacked in three stages and corresponding suspension arms are used.

As shown in FIGS. 2(a) and 2(b), in the ramp of the present invention, guide support holes 52 for engaging the associated guiding parts 28 having a relatively large thermal expansion coefficient but made of small-friction material for sliding of the associated suspension arms as first engagements are made associated with the respective guiding parts 28 in the guide supporting member 51 made of material having a relatively small thermal expansion coefficient. Each of the guiding parts 28 is provided at its support surface side with a supporting projection 57 as a second engagement. Since the supporting projection 57 is engaged in the guide support hole 52, the guide supporting member 51 and guiding part 28 are integrally formed as shown in FIG. 2(b).

In this connection, only area zones of the guide support hole 52 and supporting projection 57 having a strength sufficient for the engagement are required to belong to a guide contact surface 28a, and thus the presence of zones not belonging to the guide contact surface 28a may be allowed.

In this way, the guide support holes 52 for individual engagement with the guiding parts 28 are made in the guide supporting member 51 having a relatively small thermal expansion coefficient and the supporting projections 57 are provided to the respective guiding parts 28 having a relatively large thermal expansion coefficient for engagement with the guide supporting member 51. As a result, the amount of deformation in the front edge 29 of the guiding part 28 in the ramp caused by the thermal expansion in the disk lamination direction (P direction) while keeping parallel to the recording disk surface can be suppressed, when compared with the prior art example wherein the guide support holes are made in guide spacing part 53 at given positions or between the guiding parts 28.

Further, each of the positions of the guide support holes 52 in the guide supporting member 51 is set so that the position is the shortest to the associated front end edge 29 within the guide contact surface 28a for the associated guide supporting member 51 to be contacted with the associated guiding part 28. The "shortest" as used in this case should be broadly interpreted in that it is not interpreted as limited simply to its distance element alone but the position is also set to be as close to the front end edge 29 as possible while satisfying various conditions including strengths, etc. demanded by the guiding part 28 and guide supporting member 51 when the guiding part 28 is engaged with the guide supporting member 51. In this connection, the guide supporting member 51 is assumed to be dimensionally set so as not to be contacted with the recording disk 17 and suspension arm 14. The supporting projection 57 of the guiding part 28 is provided at a position opposed to the associated guide support hole 52 so as to conform to the dimensions of the guide support hole 52.

In this way, since the position of the guide support hole 52 made in the guide supporting member 51 having the relatively small thermal expansion coefficient is set closer to the associated front end edge 29 of the guiding part 28, the length from the guide support hole 52 to the release side end of the front end edge 29 corresponding to a moment arm when the front end edge 29 is deformed can be minimized and thus the amount of deformation in the front end edge 29 in the Q or R direction can be suppressed.

Further, one guiding part 28 is molded individually as separated from the other guiding parts as away as possible 28 as far as circumstances of strength, etc. permit. No bridging member having the same material as the guiding part 28 for linking the adjacent guiding parts 28 should be provided at least between the front end edge 29 of the guiding part 28 and the guide support holes 52. In particular, no bridging means for linking the support surface and its opposed surface in each guiding part should be provided.

The "bridging member" used in this case means a member which applies a stress in such a direction that the thermal expansion of the member causes the front end edges of the guiding parts or side end edges thereof located at both ends to be expanded. Accordingly, a bridging member which, for example, is made of the same material as the guiding part, has such a shape as connect the adjacent guiding parts, and connects the adjacent guiding parts in the form of a film, or which connects by a narrow width cladding of the guide supporting member 51 with sufficiently smaller than the width of the guiding part 28, is considered to apply a insufficient stress to the guiding parts 28 at the both ends due to the thermal expansion. Thus such a member may be excluded from the bridging member in the present invention.

Thus since such a force as to deform the guiding part 28 in the Q or R direction by the thermal expansion of the bridging member cannot be generated, the amount of deformation of the front end edge 29 in the Q or R direction can be suppressed.

Explanation will next be made as to a design technique for minimizing the width dimension of the front end edge 29 of each guiding part 28.

Figure 3:
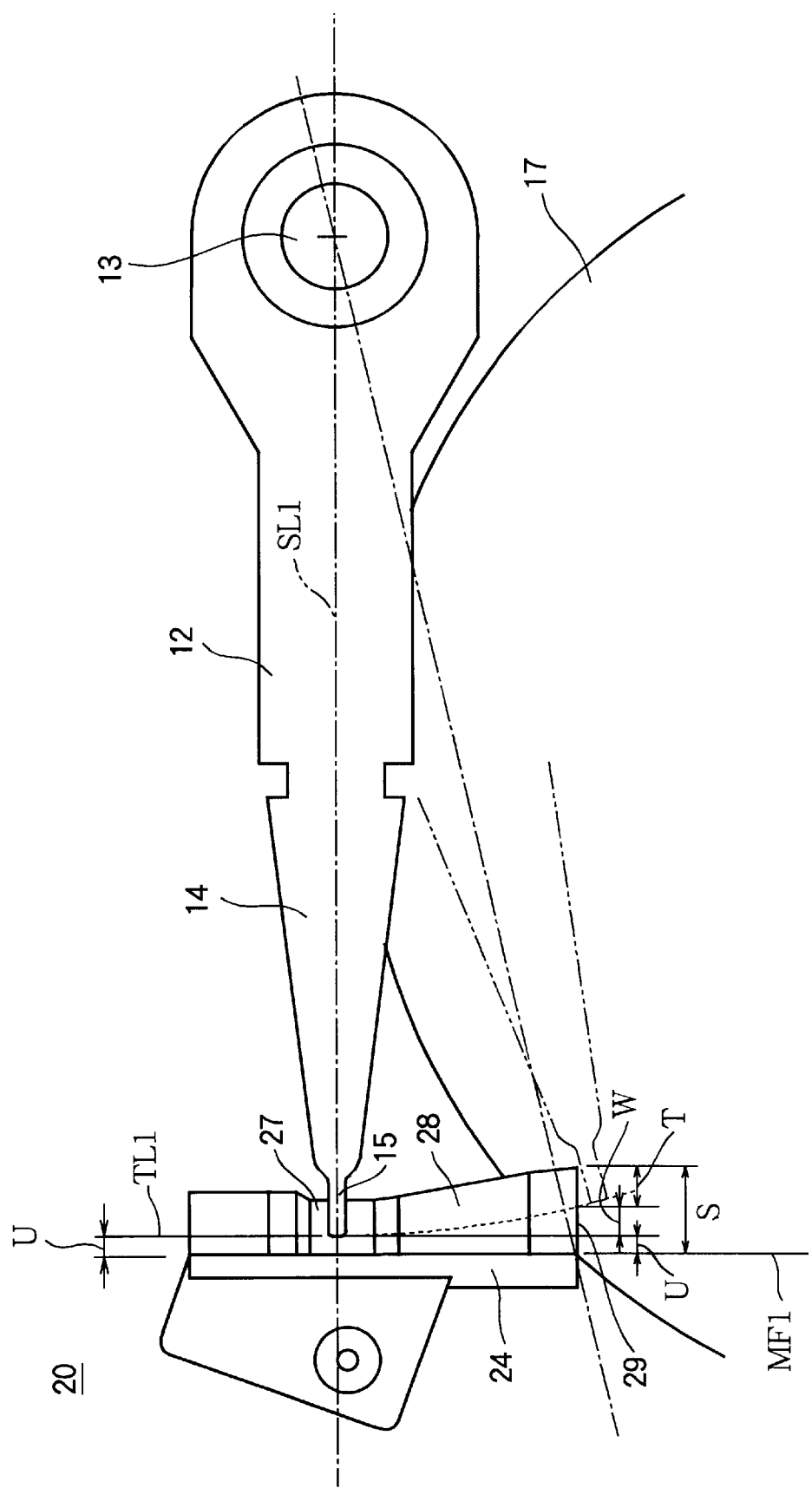
FIG. 3 shows a respect of relative position between a suspension arm and a ramp in the prior art.
Figure 4:
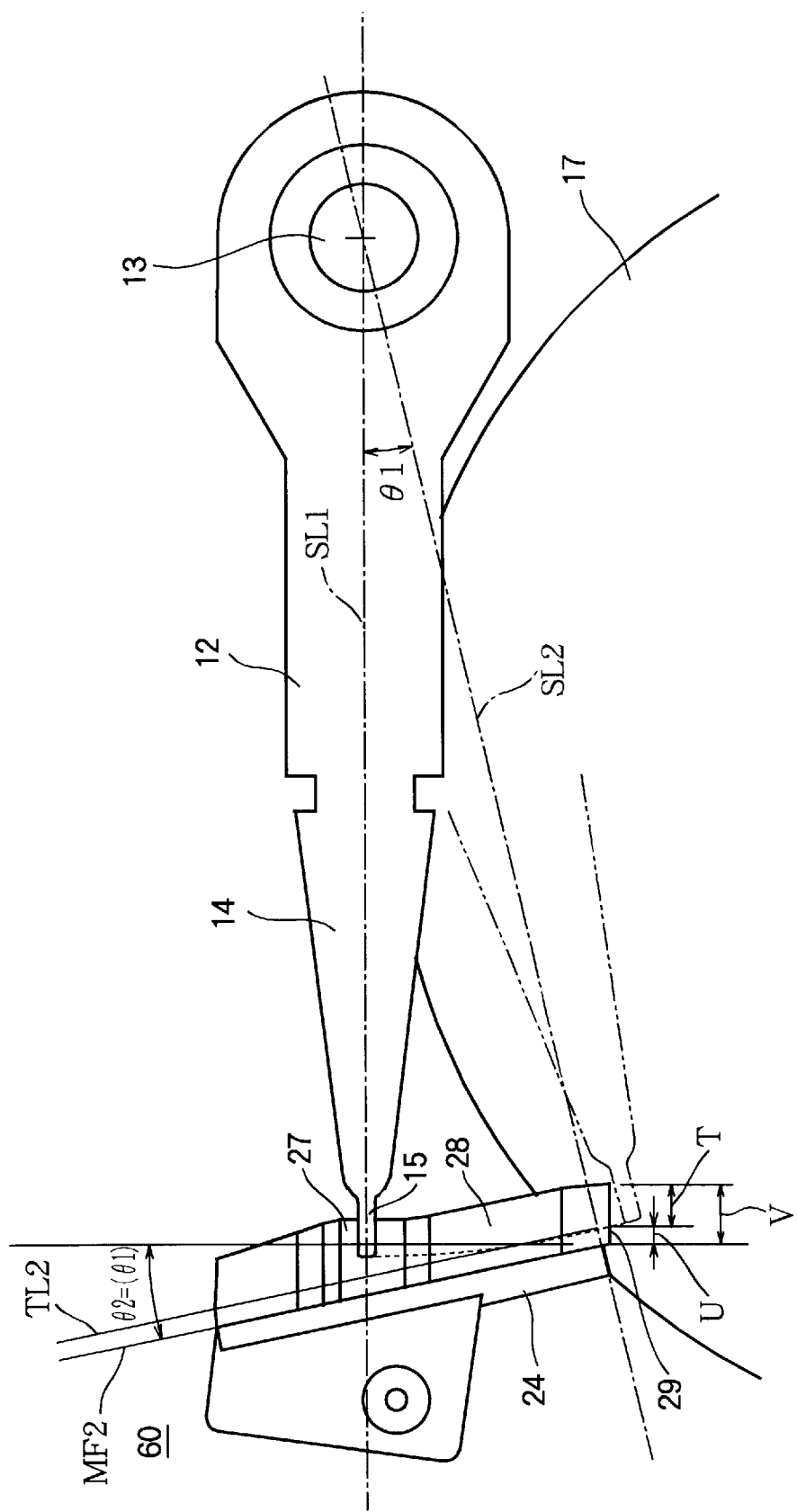
FIG. 4 shows a respect of relative position between a suspension arm and a ramp in the present invention.

FIG. 3 shows a relative position relation between a suspension arm and a ramp in the prior art, whereas, FIG. 4 shows a relative position relation between a suspension arm and a ramp in the present invention.

In the prior art design technique, the ramp 20 is designed so that a tangent line TL1 at an intersection point between a center line SL1 of the suspension arm 14 when stored or loaded and a circular arc drawn by the tip end of the lifting projection 15 provided at the leading head of the suspension arm 14 is parallel to a support surface MF1 of the guiding part 28 of the support 24, as shown in FIG. 3. For this reason, a radial component W of the circular arc drawn by the tip end of the lifting projection 15 is applied to a safety margin T between the guiding part 28 and lifting projection 15 and also to a safety margin U between the support 24 and lifting projection 15, so that the width dimension S of the front end edge 29 is larger than the width dimension of the accommodation zone 27.

In the design technique of the present invention, on the other hand, a tangent line TL2 at an intersection point between a center line SL2 of the suspension arm 14 of FIG. 3 when moved by a load angle θ and discharged from the front end edge 29 to the recording disk 17 and a circular arc drawn by the tip end of the lifting projection 15 provided at the leading head of the suspension arm 14 is parallel to a support surface MF2 of the guiding part 28 of the support 24, as shown in FIG. 4. That is, a ramp 60 is designed so that the support 24 of FIG. 3 is shifted by a shift angle θ2 identical to the load angle θ1 from the angle of the support in the prior art around the intersection point between the center line SL2 and the arc drawn by the tip end of the lifting projection 15 as a center.

Thus since the width dimension V of the front end edge 29 of the guiding part 28 includes only the safety margin T between the guiding part 28 and lifting projection 15 and the safety margin U between the support 24 and lifting projection 15, the width dimension of the accommodation zone 27 can be made small and thus a resultant necessary width dimension can be minimized. In this connection, it is also possible, for example, that the support 24 in FIG. 4 is bent at a some midpoint in its longitudinal linear part or the longitudinal part of the support 24 is formed in the form of an arc, whereby the leading head of the suspension arm 14 when loaded can near the guiding part 28.

Although the support surface MF2 of the support 24 has been made linear and parallel to the tangent line TL2 in FIG. 4, the support surface MF2 may be made arc and parallel to the arc drawn by the tip end of the lifting projection 15, thus suppressing the width dimension of the accommodation zone 27 to the same dimension as in the prior art. As a result, the bracket can be made to have substantially the same dimension as in the prior art, so that, even when the width dimension V of the front end edge 29 is made small, the dimensions of the housing of the magnetic recording disk apparatus can be accommodated within a dimensional range similar to in the prior art.

In this way, since the transversal width dimension V of the front end edge 29 of the guiding part 28 corresponding to a moment arm can be designed to have a minimum, the amount of momentary deformation in the front end edge 29 in the R direction can be suppressed.

First Embodiment

Figure 5B:
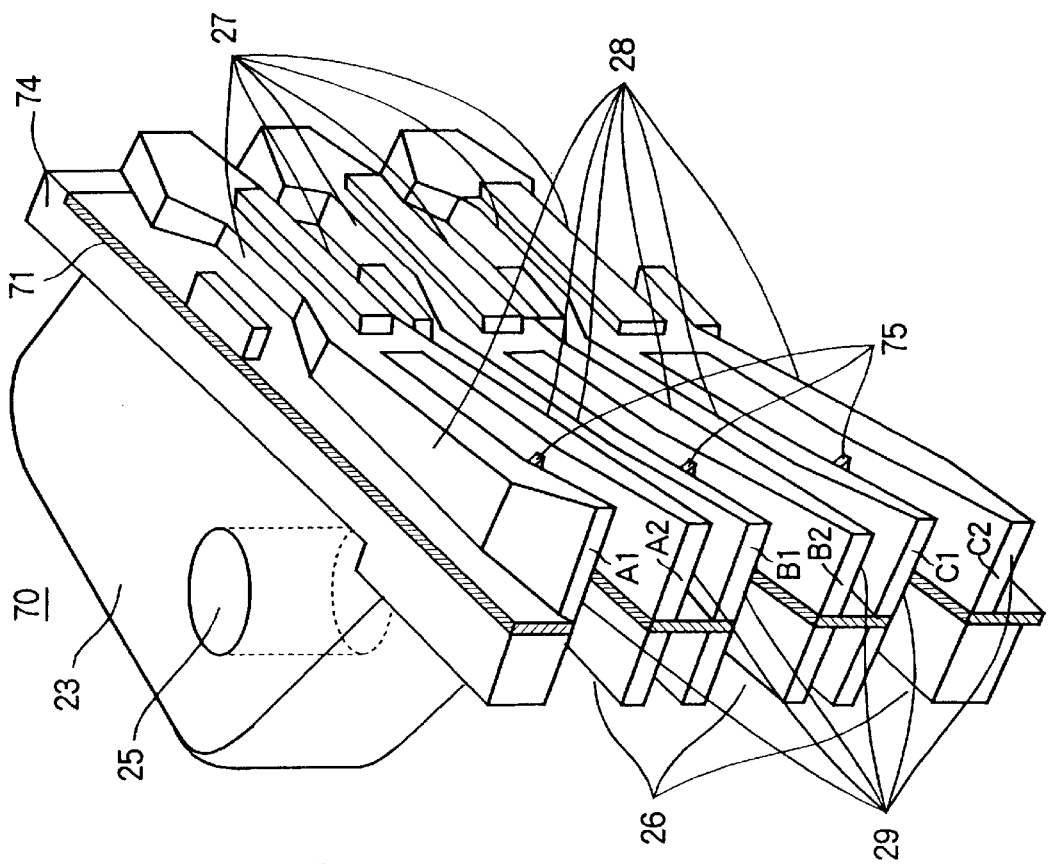
FIG. 5(b) is a perspective view of the guiding parts and guide supporting member of FIG. 5(a) when engaged with each other.
Figure 5A:
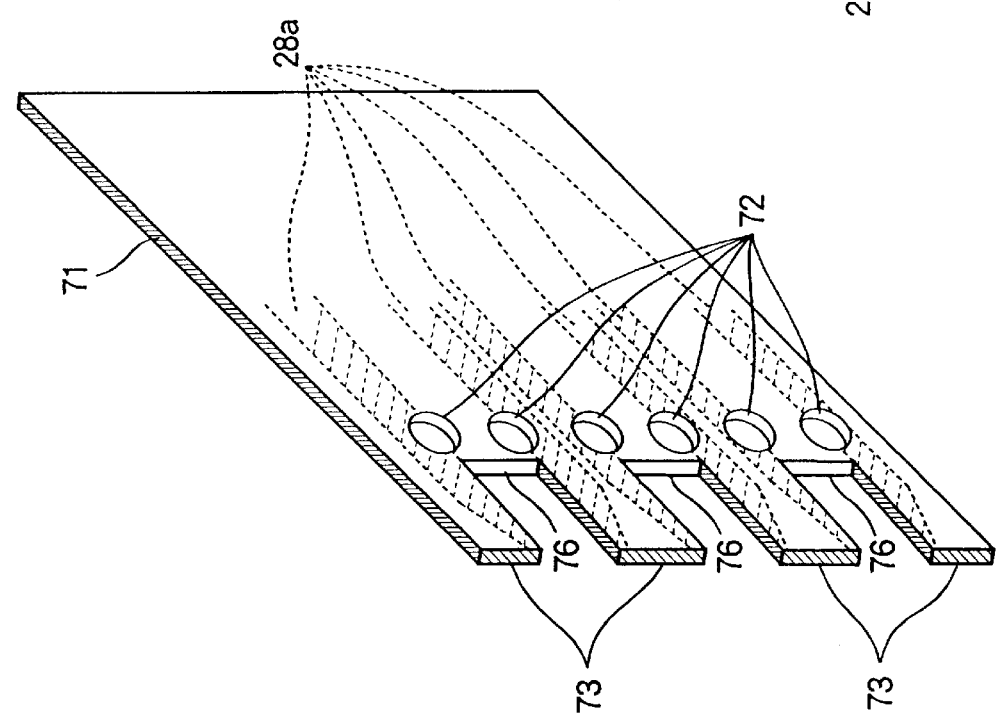
FIG. 5(a) is a perspective view of a guide supporting member in the ramp in accordance with a first embodiment of the present invention.

FIGS. 5(a–b) are perspective views of a structure of a ramp in accordance with a first embodiment of the present invention. FIG. 6(a) is a enlarged side view of a part of guiding parts including front end edges of the ramp of FIGS. 5(a–b), and FIG. 6(b) is a front view of FIG. 6(a), corresponding to a part of a cross-sectional view of FIG. 1 along section A—A when viewed from an arrowed Z direction.

A guide supporting member 71 in the present embodiment is obtained by blanking a metallic plate such as a stainless plate, and corresponds to the basic guide supporting member 51 in FIG. 2 but additionally provided with a constitution of applying additional functions. A ramp 70 shown in FIGS. 5 and 6 in the present embodiment is different from the conventional ramp 20 shown in FIGS. 1 and 2 mainly in that, in the ramp 70, the guide supporting member 71 made of a stainless plate or the like is buried in a support 74 and connection parts (guide support holes 72 and a guide support projection 77) for engaging the guiding parts 28 with the guide supporting member 71 are provided for each of the guiding parts as biased toward the front end edges 29 of the guiding parts as possible, in that the conventional bridging beam 40 made of the same material as the guiding part 28 is removed and anti-lean support parts 75 are instead formed, and in that the dimension of the front end edge 29 is different from that in the prior art due to a difference of the mounting angle of the guiding part 28 to the support 74 from that in the prior art as shown in FIG. 4.

Figure 12:
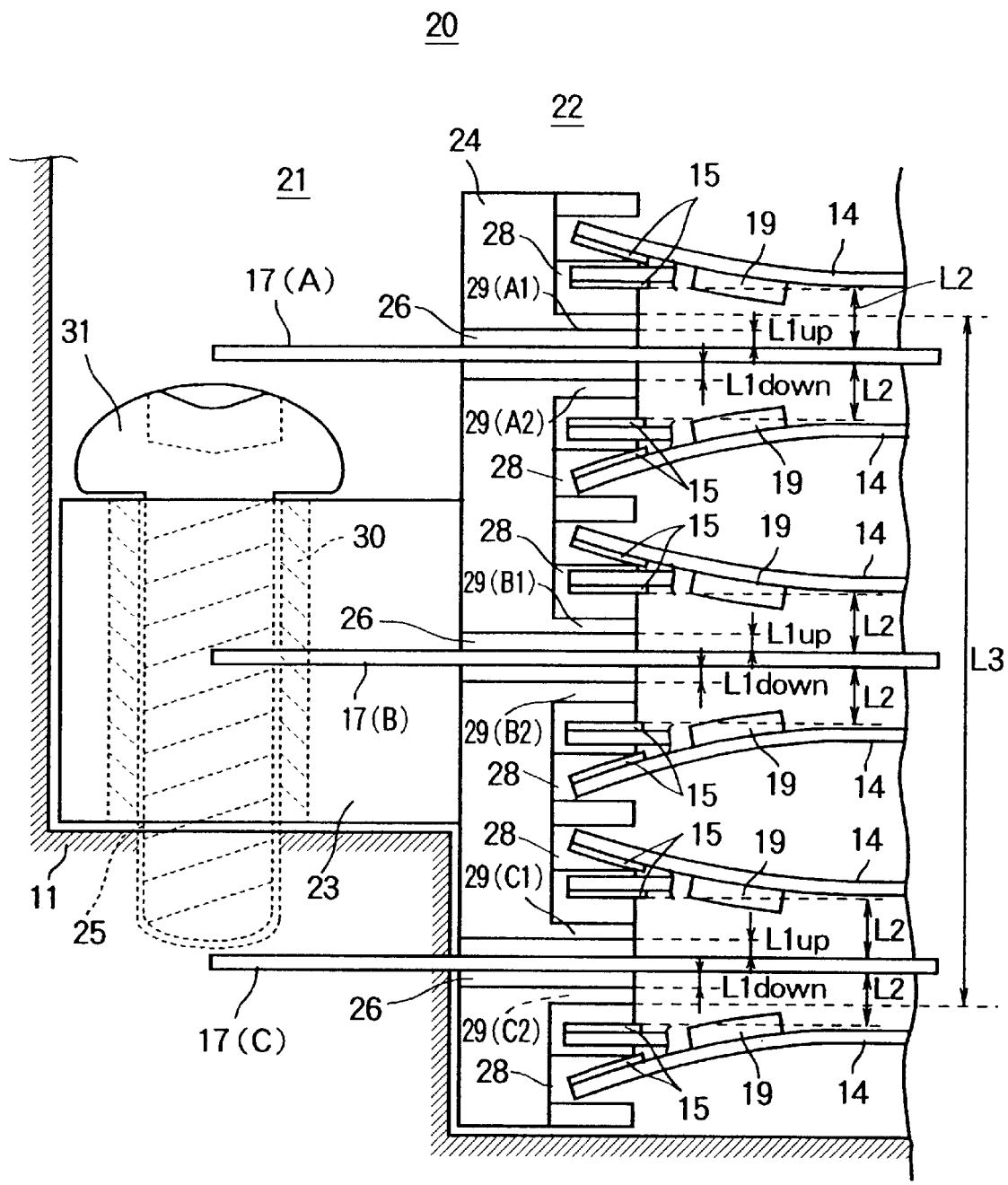
FIG. 12 is a cross-sectional view showing a positional relationship between the ramp, suspension arm and recording disks in FIG. 11(a)

The ramp 70 of the present embodiment, as in the conventional ramp 20 of FIG. 12, is fixed to the housing 11 of the magnetic recording disk apparatus 10 shown in FIG. 1 by means of the screw 31 so that three recording disks 17(A), 17(B) and 17(C) arranged as nested into the ramp 70 in a non-contacted relationship therewith and that the suspension arms 14 are spaced from the respective recording disks 17 by the associated guiding parts 28.

Since the guide supporting member 71 in the present embodiment has a good bondability with the material of the stainless plate after injection molded and the material of the guiding parts 28, the guide supporting member 71 is arranged to have front end edge support parts 73 extended in a comb-tooth manner up to the front end edges 29 of the guiding parts 28 except for the nested part of the recording disks 17 in order to suppress the amount of deformation in the front end edges 29.

The guide support holes 72 in the guide supporting member 71 for support of the guiding parts 28 are provided in the associated guide contact surfaces 28a of the guide supporting member 71 at positions close to associated guide gaps 76 other than the front end edge support parts 73 extended in the comb-like shape. In this connection, as already explained even in FIG. 2, it is only required that the guide support holes 72 and guide support projections 77 have area zones which have a sufficient strength for the engagement and which are located within the associated guide contact surfaces 28a. Thus it is allowed that, for example, area zones of the guide support holes 72 and guide support projections 77 are located out of the associated guide contact surfaces 28a as shown in FIGS. 5(a–b) or 6(a–b).

Further, the guide support projection 77 of the guiding parts 28 is provided with the anti-lean support parts 75 which is made of the same material as the guiding parts 28 and which act to prevent the guiding parts 28 from being leaned toward the associated recording disks 17. The anti-lean support parts 75 are provided in zones of the guide support projections 77 extruded from the guide contact surfaces 28a so that the guiding parts 28 will not form any bridging members.

The anti-lean support parts 75 are provided, in particular, so as to prevent formation of any bridging member linking between the faces of the guiding parts 28 opposed to the guide supporting member 71. However, as mentioned above, a bridging member between the guiding parts 28 along the guide supporting member 71 in the form of a film or a bridging member for connecting only its side of the guide supporting member 71 with the guiding parts 28 with a narrow width sufficiently smaller than that of the guiding parts can be excluded from the definition of the word "bridging member", because such a bridging member applies a small stress to the guiding parts during the thermal expansion.

Figure 7:
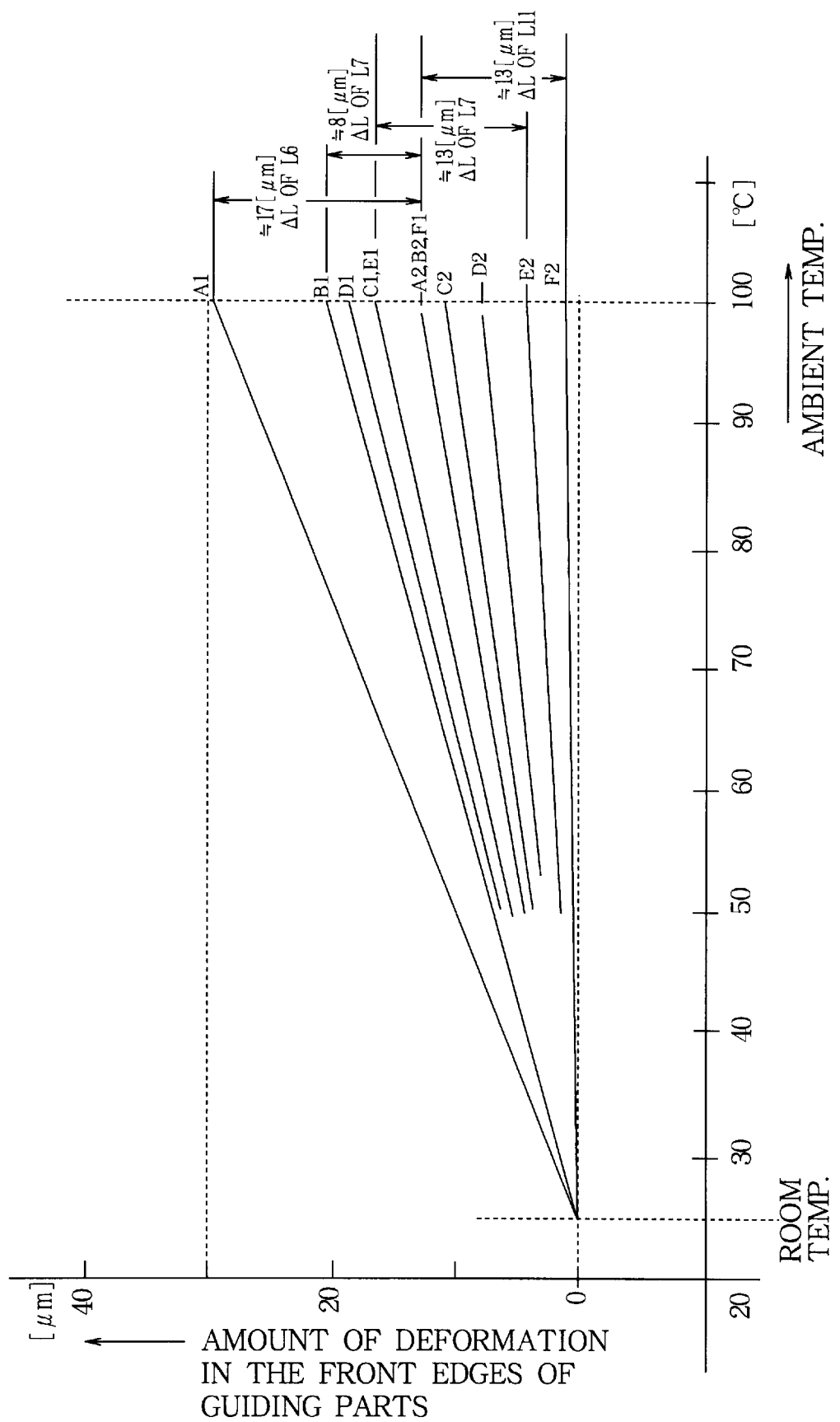
FIG. 7 is a diagram showing a relationship between temperature and deformation of the front end edges of the guiding parts when the ramp of the present embodiment shown in FIGS. 5 and 6 is of a six disk type.
Figure 14:
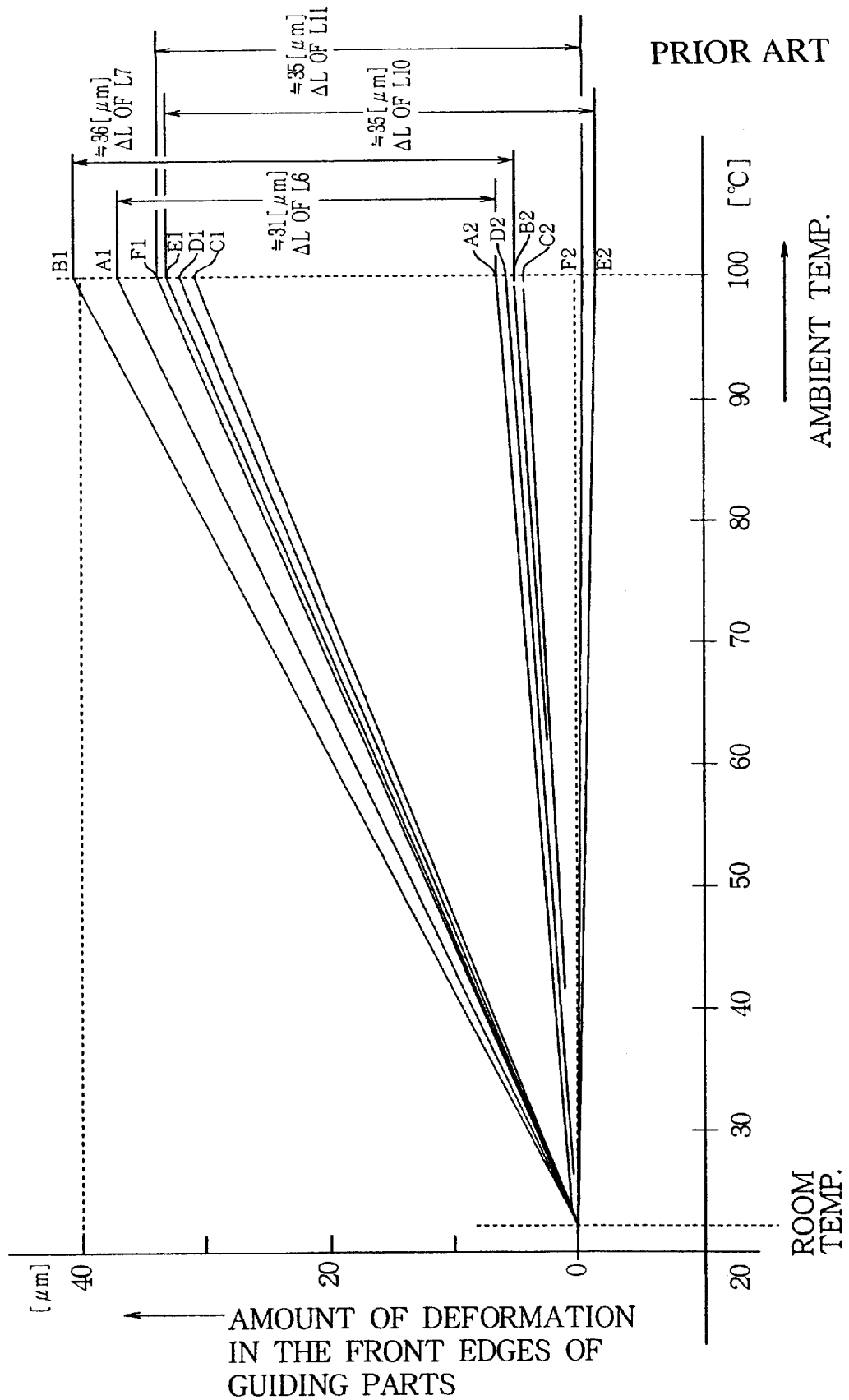
FIG. 14 is a diagram showing a relationship between temperature and deformation in the front end edges of the guiding parts in the conventional ramp when six disk type of metallic plates are inserted into a support.

FIG. 7 shows a relationship between the temperature and deformation in the front end edge 29 of the guiding part 28 when the ramp 70 of the present embodiment shown in FIGS. 5 and 6 has six disks, for comparison with FIG. 14.

In FIG. 7, as in FIG. 14 when measurement is carried out for the conventional ramp having the six disk type of metallic plates, the amounts of deformation in the front end edges 29 (A1, A2, B1, B2, C1, C2, D1, D2, E1, E2, F1 and F2) of twelve guiding parts 28 corresponding to the upper and lower sides of the six recording disks were measured with changed ambient temperatures.

Similarly to FIG. 14, further, it is assumed that L6 denotes the length of an interval between the front end edges 29 (A1 and A2) of the guiding parts 28 corresponding to the upper and lower sides of the first recording disk A, L7 denotes the length of an interval between the front end edges 29 (B1 and B2) corresponding to the upper and lower sides of the second recording disk B, L8 denotes the length of an interval between the front end edges 29 (C1 and C2) corresponding to the upper and lower sides of the third recording disk C, L9 denotes the length of an interval between the front end edges D1 and D2 corresponding to the fourth recording disk D, L10 denotes the length of an interval between the front end edges E1 and E2 corresponding to the fifth recording disk E, and L11 denotes the length of an interval between the front end edges F1 and F2 corresponding to the sixth recording disk F.

In the present embodiment, as shown in FIG. 7, a change (ΔL in the interval L6 between the front end edges A1 and F2) in the interval between the front end edge A1 and F2 is about 29 $\mu$m for 100° C. that is smaller than about 40 $\mu$m in FIG. 14, and a change in the entire ramp is decreased. A change in the interval L6 between the front end edges A1 and A2 is about 17 $\mu$m, a change in the interval L7 is about 8 $\mu$m, a change in the interval L10 is about 13 $\mu$m, a change in the interval L11 is about 13 $\mu$m, so that, even when observed for each recording disk, the amount of deformation in the front end edge 29 of the guiding part 28 is decreased to such a level as to less cause a problem. That is, in the present embodiment, not only the amount of deformation between the front end edges 29 of the guiding parts 28 at the upper and lower ends of the arm holder but also the amount of deformation of the front end edge 29 of the guiding part 28 for each recording disk can be decreased.

As will be appreciated from the foregoing explanation, in the ramp 70 of the present embodiment, when a temperature cycling test is conducted, the entire thermal expansion of the front end edges 29 of the guiding parts 28 of the arm holders can be decreased.

Accordingly, in accordance with the ramp 70 of the present embodiment, the thermal expansion coefficient of the ramp in the disk stacking (laminating) direction can also be decreased when compared to the conventional ramp, whereby the possibility of generation of undesirable metallic particles during movement of the suspension arm 14 can be reduced.

As has been explained in connection with FIGS. 2 to 4, since the ramp 70 of the present embodiment has a structure similar to the basic structure of the present invention, it can exhibit effects unique to the present invention.

More specifically, in the ramp 70, since the sides of the accommodation zones 27 adjacent back to back are connected with the same material but the guide support holes 72 and guide support projections 77 are engaged with each other as shown in FIG. 5, the thermal expansion of the connected parts of the accommodation zones 27 can cause the front end edge 29 of the guiding part 28 to be less deformed in the disk lamination direction (P direction) while keeping parallel to the recording disk plane beyond the guide support projection 77.

In the present embodiment, further, since the guide support hole 72 and guide support projection 77 are provided for each of the guiding parts 28 and their provision locations are set as close to the associated front end edges 29 as possible, i.e., to be the closest thereto, the amounts of deformation in the front end edge 29 in the Q or R direction can be made small.

In the present embodiment, furthermore, since the front end edge 29 of each guiding part 28 is designed to have such a width V as shown in FIG. 4, the front end edge width V can be made smaller than that of the front end edge of the guiding part in the prior art shown in FIG. 3 and thus the amount of deformation in the front end edge 29 in the Q or R direction can be made small.

In addition, since the anti-lean support part 75 is provided so as to form a bridging member which connect the sides of the guiding parts 28 opposed to the guide supporting member 71, the amount of deformation in the front end edge 29 in the Q or R direction can be suppressed. At the same time, even when the bridging beam 40 in the prior art is removed, the guiding part 28 can be prevented from being leaned toward the recording disk plane of the guiding part 28.

In the present embodiment, comb-like provision of the front end edge support parts 73 in the guide supporting member 71 enables suppression of the amount of deformation of the front end edge 29 in the Q or R direction.

Second Embodiment

In the above first embodiment, the stainless plate has been used as the guide supporting members. However, some of the inventors of the present application have invented a ramp wherein a mount is made of a polymeric material having a small thermal expansion coefficient different from that of an arm holder and two-color molded (two sorts of materials continuously molded), as disclosed in Japanese Patent Application No. 2000-31985. Thus explanation will be made as to a second embodiment which follows when a ramp is two-color molded.

Figure 8:
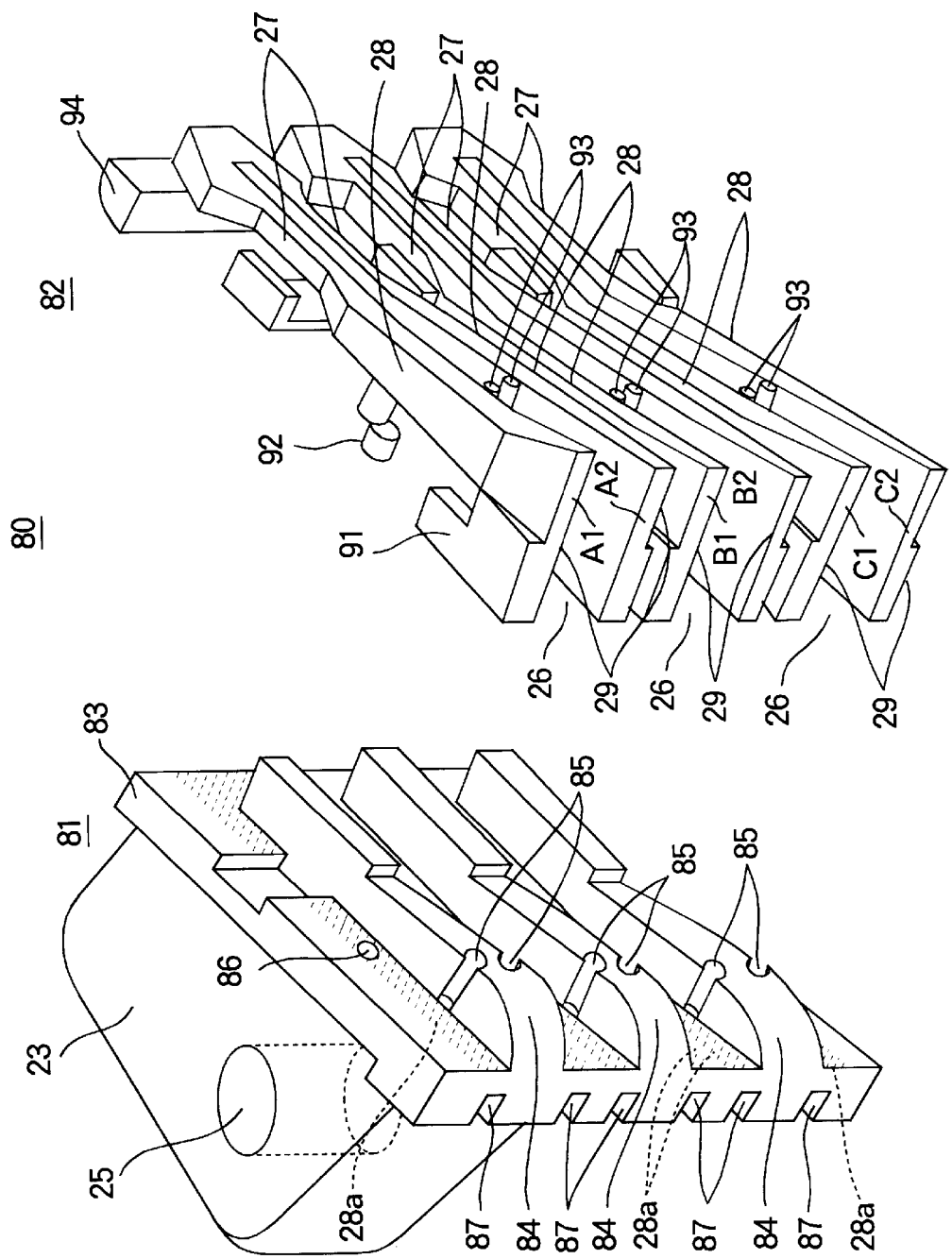
FIG. 8 shows perspective views of a constitution of a ramp in accordance with a second embodiment of the present invention.
Figure 9:
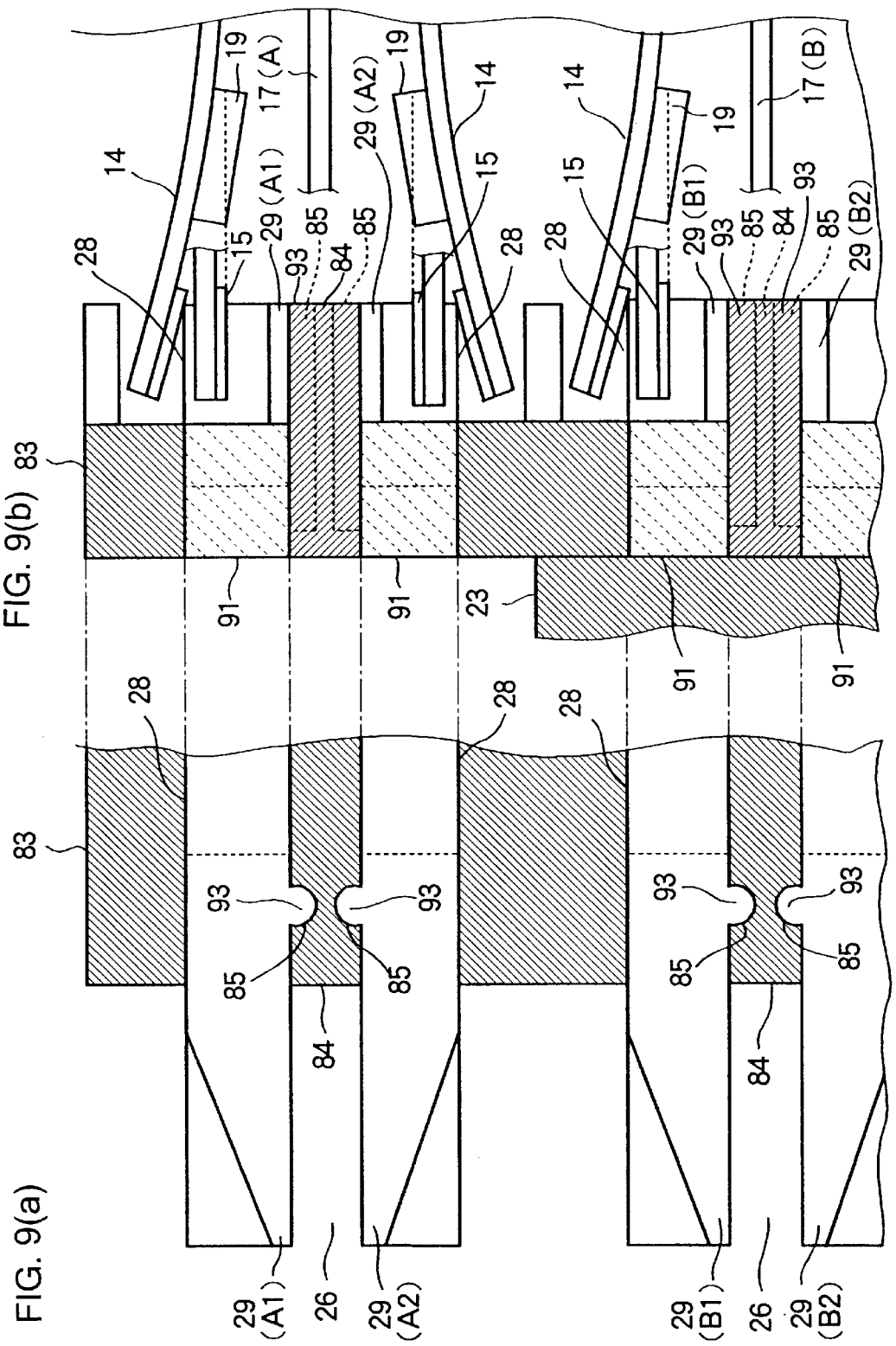
FIG. 9(a) is a enlarged side view of a part of the guiding parts including the front end edge of the ramp of FIG. 8.
FIG. 9(b) is a front view of FIG. 9(a)

FIG. 8 shows perspective views of a constitution of a ramp in accordance with the second embodiment. FIG. 9(*a*) is an enlarged side view of a part of guiding parts including front end edges in the ramp of FIG. 8, and FIG. 9(*b*) is a front view of FIG. 9(*a*), corresponding to a cross-sectional view of a part of FIG. 1 along section A—A in FIG. 1 when viewed from an arrowed Z direction.

It is the entire support 83 in the present embodiment that corresponds to the basic guide supporting member 51 in FIG. 2. However, a structure of providing a function of the bracket 23 and a function of suppressing a dimensional change caused by thermal expansion is added to the basic guide supporting member 51 of FIG. 2.

Figure 11A:
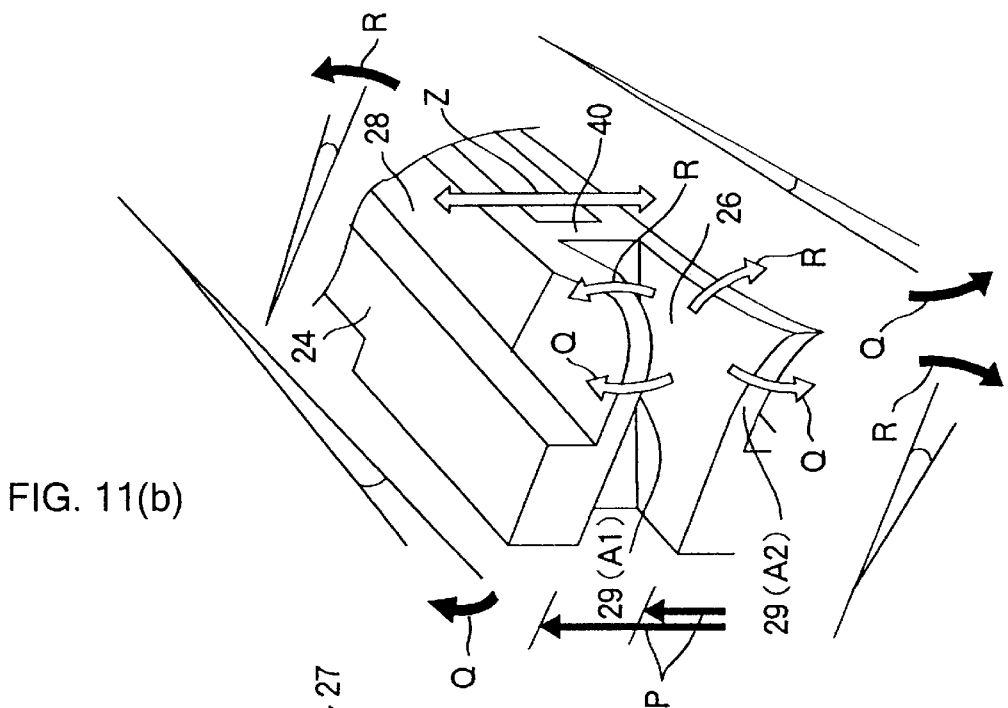
FIG. 11(a) is a perspective view of a conventional ramp when all parts are integrally molded with use of a polymeric material containing polytetrafluoroethylene (PTFE)
Figure 11B:
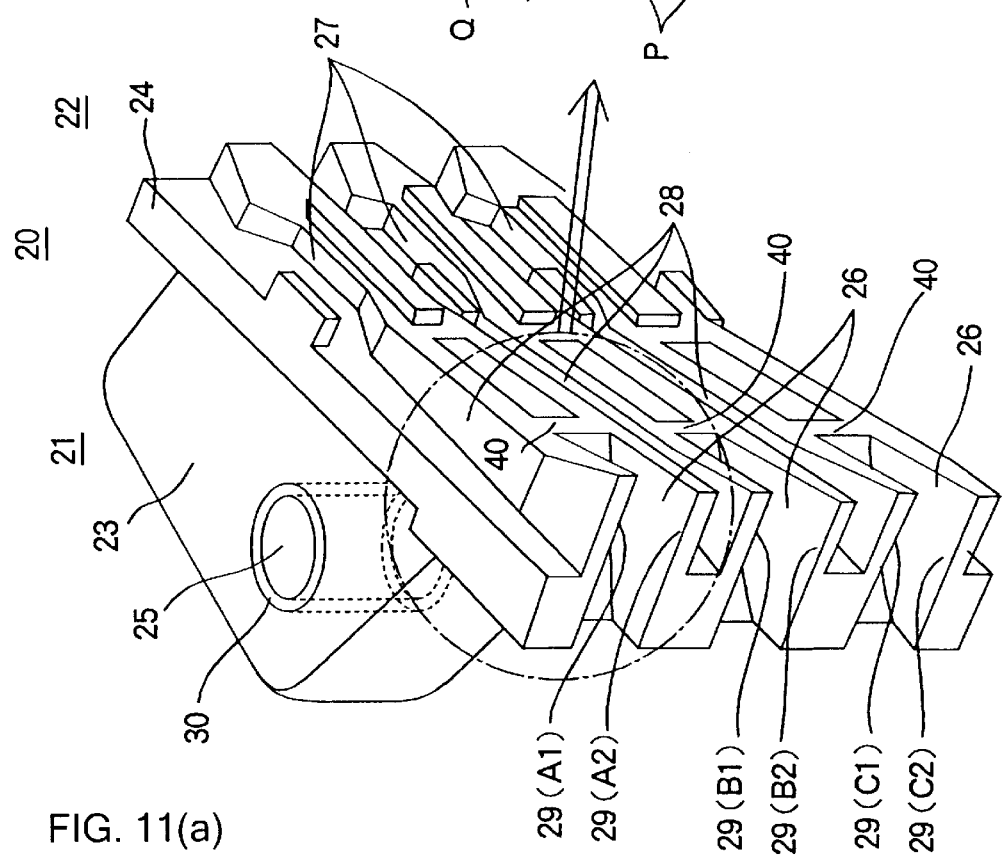
FIG. 11(b) is an enlarged perspective view of the front end edge of the guiding part for guiding the suspension arm in the ramp of FIG. 11(a)

A ramp 80 of the present embodiment shown in FIGS. 8 and 9(*a–b*) is different from the conventional ramp 20 shown in FIGS. 11 and 12 mainly in that, the ramp 80, the support 83 and arm holder 82 are two-color molded with different materials, hook-shaped connection parts (hooks 91, 92, 94, guide support projections 93, etc.) for engagement between the support 83 and arm holders 82 are provided for each guiding part, and in particular, the guide support projection 93 and associated guide supporting recess 85 are provided as close to the front end edge 29 of the guiding part as possible, in that the bridging beam 40 in the prior art made of the same material as the arm holder 82 (guiding part 28) is removed and a guide spacing part 84 is made of the same material as the support 83, and in that the front end edge 29 has a different dimension due to a difference in the mounting angle of the guiding part 28 to the support 83.

Even in the case of the ramp 80 of the present embodiment, as in the conventional ramp 20 of FIG. 12, the ramp 80 is fixed to the housing 11 of the magnetic recording disk apparatus 10 shown in FIG. 1, so that three recording disks 17(A), 17(B) and 17(C) are arranged as nested into the ramp 80 in a non-contacted manner therewith, and the suspension arms 14 are spaced by the associated guiding parts 28 from the respective recording disks 17.

The ramp 80 of FIG. 8, further, is arranged as a combination of a mount 81 as a block part having guide supporting recesses 85 and an arm holder 82 as a block part having guiding parts 28. The guiding part 28 facilitates entrance or exit of the associated suspension arm 14 into or from the associated accommodation zone by sliding the accommodation zone 27 and lifting projection 15 which holds the slider 19 having a write/read magnetic head to the associated recording disk 17 mounted thereon as spaced from the recording disk 17.

Although the mount 81 and arm holder 82 have been illustrated as two blocks separated from each other in FIG. 8 for convenience of explanation, undercut hole and hook parts, etc. as a hooking means (which will be explained later) are provided as molded at the connection interface between the mount and arm holder so that the undercut hole and hook parts are engaged each other. For this reason, the mount 81 will not be separated from the arm holder 82.

In the ramp 80 of the present embodiment, unlike the conventional ramp 20 integrally molded as shown in FIG. 11(*a*), the mount 81 and arm holder 82 are made of different polymeric materials and molded.

Hereinafter, how to molding(two-color molding) the ramp 80 in the present embodiment will be briefly explained.

As the polymeric material of the mount 81, a material having a small thermal expansion coefficient and less creep deformation is selected. For example, polyetherimide (PEI), polyimide (PI), polycarbonate (PC), polyether sulfone (PES) and polyphenylene sulfide (PPS) are suitable. Even when a polymeric material other than the above, e.g., polymeric material reinforced by glass fibers or carbon fibers is employed, it produces a small thermal expansion coefficient and less creep deformation when compared to a polymeric material not reinforced. According to the polymeric material reinforced with glass or carbon fibers can also be selected. In the present embodiment, PEI is selected and ULTEM® 1000 available from GE Plastics is used and molded into the mount 81.

Since the polymeric material for molding the arm holder 82 is required to have a suppressed extensibility in the longitudinal direction of the guiding part 28, a low friction coefficient and a good abrasion resistance property, liquid crystal polymer (LCP) was selected as the polymeric material of the arm holder 82 and a trade name "VECTRA A430" available from Hoechst-Celanese, Inc. was used. VECTRA A430 is copolyether of 4-hydroxybenzoic acid and 6-hydroxy-naphthoic acid (HAHN). HAHN has a low friction coefficient and an excellent frictional characteristic. HAHN further has a highly anisotropic thermal expansion coefficient and thus has two thermal expansion coefficients. LCP used in the present embodiment contains polytetrafluoroethylene (PTFE) in order to reduce the frictional coefficient of the guiding part 28.

Generally speaking, it is very difficult for LCP and PEI to be fused and, even when the both materials are molded by an ordinary two-color molding technique, the both materials are less fused at their contact surfaces. Further, PTFE is mixed in LCP in the present embodiment and mixing of PTFE in LCP acts to impede fusing of LCP and PEI, so that, even when LCP and PEI are molded by the ordinary two-color molding technique, LCP and PEI will not be fused at their contact surfaces at all.

For this reason, in the present embodiment, the guide supporting recesses 85, fixing holes 86 and 87 as a locking means are formed by a die molding technique or by a technique such as undercut at a contact surface of the mount 81 on the side of the arm holder 82; and the guide support projections 93, hooks 91 and 92 are formed by the ordinary die molding technique or by a technique such as undercut at the contact surface of the arm holder 82 with the mount 81. In this connection, the "undercut" refers to a part of a molded product which cannot be released from the die without deforming the molded product or without a special die structure or refers to a caved part of the molded product. The "special die structure" refers to, for example, the structure of a die having a loose core inserted thereinto, having a slide core to be slid in the interior of the die together with the opening or closing operation of the die or having a slide pin. In other words, the "undercut" refers to the shape of such a part projected sideways of a drawing direction of the die as not to be molded in the ordinary die.

A polymeric material PEI for the mount 81 and a polymeric material LCP for the arm holder 82 in the present embodiment, which can be molded at an identical die temperature, are selected. This is for the purpose of avoiding that a residual stress during the molding operation be applied to one or the other of the mount 81 and arm holder 82. Further, when polymeric materials having an identical die temperature range are selected as the polymeric materials of the mount 81 and arm holder 82 to be molded so as to meet temperature conditions imposed to the die at the time of molding. Die parts for molding the both mount 81 and arm holder 82 can be provided in the single die.

According to the molding method in the present embodiment, the mount 81 is first molded with use of a polymeric material such as PEI having a small thermal expansion coefficient and a small creep deformation property, and then the arm holder 82 is molded with use of a polymeric material such as LCP containing PTFE having a small extensibility in the longitudinal direction and a small friction coefficient.

Other items and details of the above two-color molding method in the present embodiment are similar to those of a method of the same inventors as the present application disclosed in Japanese Patent Application No. 2000-31985.

Explanation will then be made as to the amount of deformation with time in the front end edge 29 of the guiding part 28 in the ramp 80 of the present embodiment molded in such a manner as mentioned above.

In the ramp 80 shown in FIGS. 8 and 9(a–b), as mentioned above, the mount 81 of the polymeric material having a relatively small thermal expansion coefficient and the arm holder 82 (guiding part 28) of the polymeric material having a low friction coefficient and an excellent frictional characteristic but having a relatively large thermal expansion coefficient are tow-color molded, and the engaged parts between the both are provided individually for each guiding part 28. For this reason, the deformation of the front end edge 29 of the guiding part 28 in the P direction shown in FIG. 11(b) can be suppressed.

Further, the ramp 80 has such guide spacing part 84 as mentioned above, and the engagement part provided individually for each guiding part 28 is provided in the guide spacing part 84 of the same material as the mount 81 and in the side of the guiding part 28 opposed to the guide spacing part 84 at such a position as to be the closest (shortest) to the front end edge 29 under conditions of avoiding the contact with the recording disk 17. Thereby the length from the guide supporting recess 85 to the front end edge 29 corresponding to a moment arm when the front end edge 29 is deformed can be minimized. In addition, since a bridging member having a relatively large thermal expansion coefficient is absent, the amounts of deformation change in the front end edge 29 in the Q and R directions shown in FIG. 11(b) can be suppressed.

Further, since the front end edge 29 of each guiding part 28 in the ramp 80 of the present embodiment is designed to have such a front end edge width V as shown in FIG. 4, the width can be made smaller than the front end edge width of the guiding part in the prior art of FIG. 3 and thus the amount of deformation can be made smaller.

Figure 10:
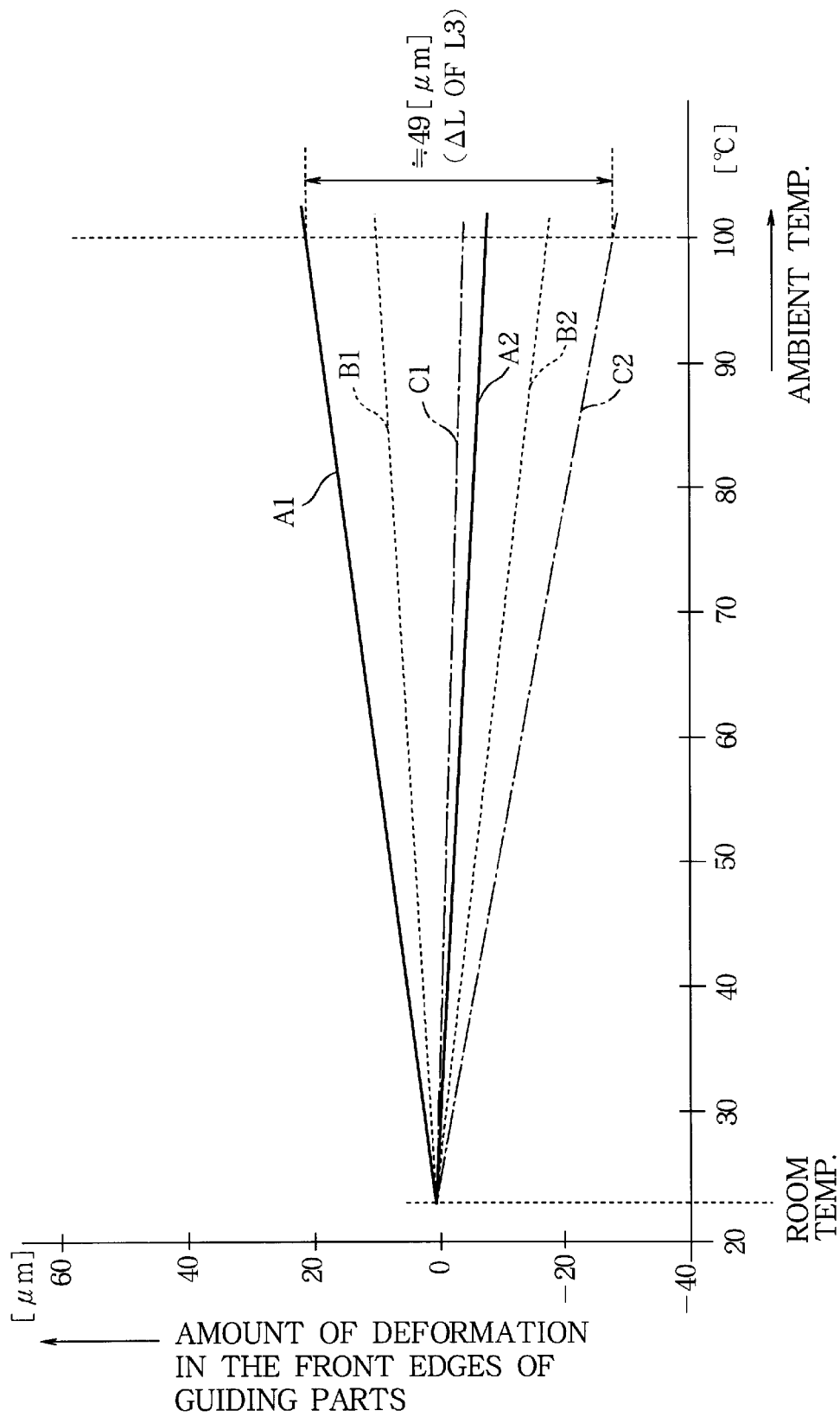
FIG. 10 is a diagram showing a relationship between temperature and deformation in the front end edges of the guiding parts in the ramp shown in FIGS. 8 and 9.

FIG. 10 is a diagram showing a relationship between temperature and deformation of the front end edge 29 of the guiding part 28 in the ramp 80 of the present embodiment shown in FIGS. 8 and 9.

Figure 13:
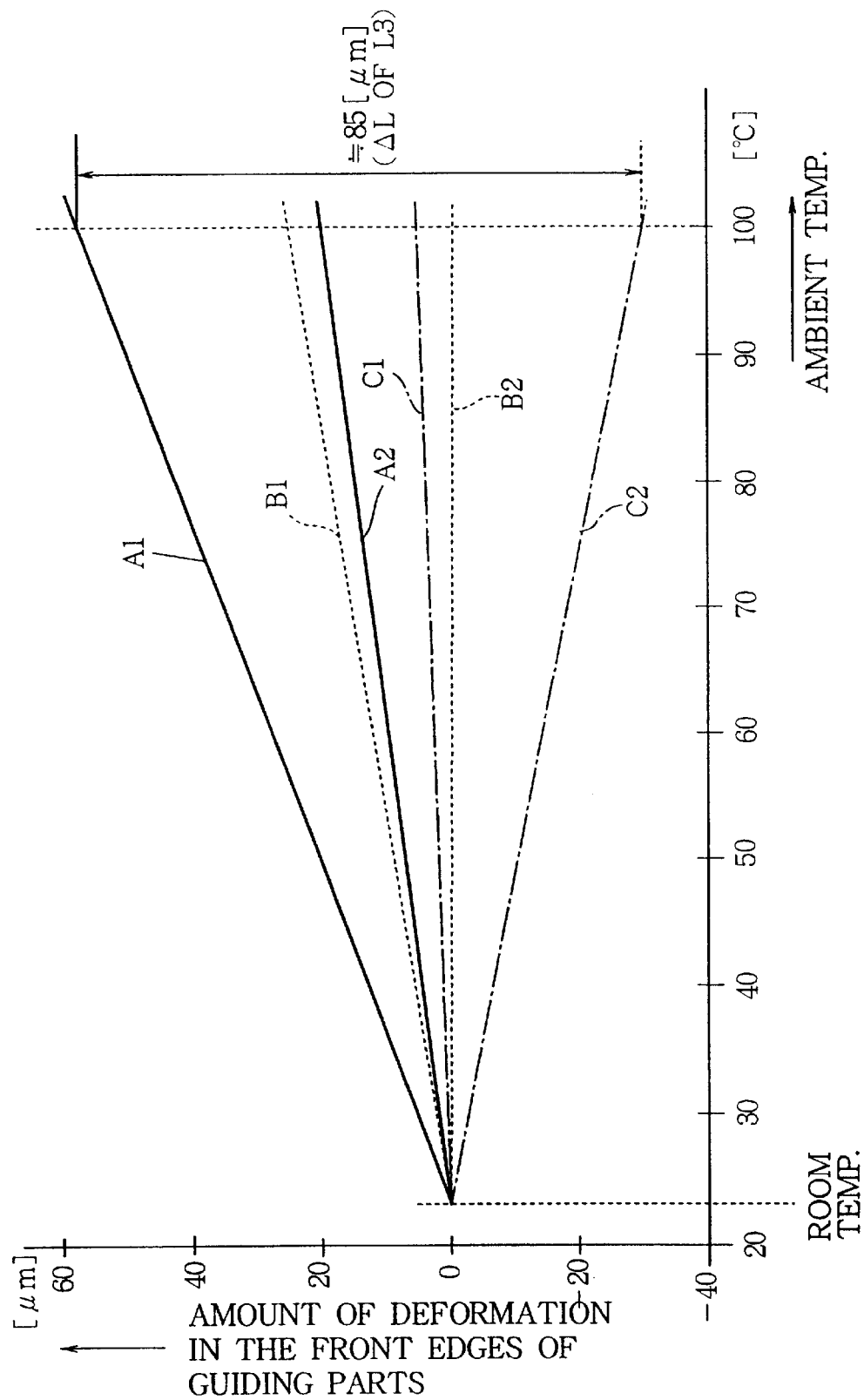
FIG. 13 is a diagram showing a relationship between temperature and deformation in the front end edges of the guiding parts in the conventional ramp shown in FIGS. 11 and 12.

In FIG. 10, similarly to FIG. 13 when the conventional ramp 20 is measured, the amounts of deformation in six front end edges 29 (A1, A2, B1, B2, C1 and C2) in FIG. 8 were measured with changed temperatures.

A most remarkable difference between the graph of the ramp 80 of FIG. 10 and the graph of the ramp 20 of FIG. 13 is that the interval (differential dimension $\Delta L$ caused by the deformation of the distance L3 in FIG. 10) between the front end edges A1 and C2 is about 49 $\mu$m for 100° C. in the graph of the ramp 80 of FIG. 10, that is smaller than about 85 $\mu$m in the conventional ramp 20 of FIG. 13. The amount of deformation in the front end edge A1, A2 or C2 is also correspondingly decreased. That is, the amount of deformation between the front end edges 29 of the guiding parts 28 at the upper and lower ends of the arm holder 82 as well as the amount of deformation in the front end edges 29 of the individual guiding parts 28 at the upper and lower ends are decreased.

It will be appreciated from the foregoing that, as a result of temperature cycling tests, the overall thermal expansion of the front end edges 29 of the guiding parts 28 in the arm holder 82 can be decreased in the ramp 80 of the present embodiment.

Accordingly, in the ramp 80 of the present embodiment, since the thermal expansion coefficient in the disk stacking (laminating) direction is decreased when compared to that in the conventional ramp 20, there can be reduced a possibility of generation of undesirable metallic particles during movement of the suspension arm 14.

Further, when the same LCP as the material of the arm holder 82 is used to mold such a thick wall member as the bridging beam 40 as in the conventional ramp 20, there is a disadvantage that "shrinkage" as recesses are formed in the surface of the thick wall member. For this reason, when LCP is employed and molded into such a thick wall member as the bridging beam 40, the wall member is required to be made thin by removing the central part of the thick wall member of the bridging beam 40. The polymeric material PEI of the guide spacing part 84 in the present embodiment, on the other hand, has a small thermal expansion coefficient and a small creep deformation characteristic when compared to those of the LCP of the arm holder 82, and therefore the PEI can be molded without causing "shrinkage". As a result, since the fast evaporation characteristic of a cleaning liquid required at the time of molding and assembling parts of a hard disk drive apparatus can be satisfied, a time necessary for post steps can be advantageously shortened.

As mentioned above, since the ramp 80 of the present embodiment is divided into a plurality of block parts such as the mount 81 and arm holder 82, the respective block parts are made of different polymeric materials, the block parts are integrally assembled by the locking means formed at the connection surface between the block parts, and the ramp 80 has a constitution similar to the basic constitution of the present invention explained in connection with FIGS. 2 to 4; the ramp 80 has effects unique to the present invention.

More concretely, since the guide supporting recesses 85 and guide support projections 93 in the ramp 80 are engaged, when the guiding part 28 thermally expands, the amount of deformation in the front end edge 29 of the guiding part 28 in the laminating direction (P direction) while keeping parallel to the recording disk plane beyond the guide support projection 93 can be made small.

In the present embodiment, further, since the guide supporting recess 85 and guide support projection 93 are provided for each guiding part 28 and are located at such positions as close to the front end edge 29 as possible and the shortest thereto, the amount of deformation in the front end edge 29 in the Q or R direction can be made small.

Even in the present embodiment, since the front end edge 29 of each guiding part 28 is designed to have such a front end edge width V as shown in FIG. 4, the width V is smaller than the front end edge width of the prior art guiding part shown in FIG. 3, whereby the amount of deformation in the front end edge 29 in the Q or R direction can be made small.

In the present embodiment, furthermore, each guiding part 28 and accommodation zone 27 are separated and the guide spacing part 84 for preventing leaning of each guiding part 28 is made of the same material as the mount 81, so that the amount of deformation of the front end edge 29 in the Q or R direction can be suppressed. And even when the bridging beam 40 in the prior art is removed, it can be prevented that the guiding part 28 is leaned toward the recording disk plane.

When the ramp 70 of the first embodiment or the ramp 80 of the second embodiment is used for the magnetic recording disk apparatus, it means that the ramp has a less amount of deformation in the front end edge 29 of the guiding part 28. Thus, the undesirable contact between the magnetic head (slider 19) and recording disk 17 when the suspension arm 14 is loaded or unloaded can be reduced.

The guide support hole 72 and guide support projection 77 or the guide supporting recess 85 and guide support projection 93 as the engagement means in each of the foregoing embodiments can produce similar effects even when the recess and projection are reversed. Further, the engagement parts in the present embodiment such as the guide supporting recess 85, fixing holes 86 and 87, guide support projection 93, and hooks 91 and 92 may take any shapes, so long as they are not easily disconnected from each other after molded into the ramp.

As has been explained in the foregoing, in the information recording disk apparatus of the present invention, since ramp is engaged with the guide supporting member for each guiding part, the amount of deformation of the front end edge of the guiding part in the disk laminating direction while keeping parallel to the recording disk plane can be made small.

With the ramp for the information recording disk apparatus of the present invention, no bridging means made of the same material as each guiding part is provided at least between the front end edge of each guiding part to the engaged part of the guiding part and guide supporting member, whereby the amount of deformation in the front end edge of the guiding part and the amount of curling-up in the side end edge thereof in its curling-up direction caused by the thermal expansion of the bridging means can be made small.

The ramp for the information recording disk apparatus in accordance with the present invention is arranged so that the engagement position of each guiding part with the guide supporting member having a small thermal expansion coefficient is as close to the front end edge of each guiding part, whereby the amount of deformation of the front end edge and side end edge of the guiding part in the curling-up direction can be made small.

With the ramp for use with the information recording disk apparatus in accordance with the present invention, further, the width of the front end edge of each guiding part is set equal to such a minimum width that the suspension arm is not brought into contact with the guide supporting member, and the guide supporting member is engaged with the guiding part at such an angle as not contacted with suspension arm. Thus the amount of deformation of the side end edge of the front end edge of the guiding part upon thermal expansion in the curling-up direction can be made small.

With the ramp for use with the information recording disk apparatus in accordance with the present invention, since the guide supporting member is extended up to its front end edge in the form of a comb except for disk escape parts, the amount of deformation of the front end edge of the guiding part in the curling-up direction can be made small.

With the ramp for the information recording disk apparatus of the present invention, since the guide spacing part having such a shape as to fill the gaps between the guiding parts are provided on the side of the guiding parts where the suspension arm is not slid, the amount of deformation in the front end edge of the guiding part in the laminating direction while keeping parallel to the recording disk plane can be made small during the thermal expansion.

Further, with the ramp of the information recording disk apparatus of the present invention, the first engagement part is provided to each guide spacing part and the second engagement part is provided at a position opposed to the first engagement part. Therefore, upon the thermal expansion, the amounts of deformation of the front end edge and side end edge of the guiding part in the curling-up direction can be made small.

With the ramp for the information recording disk apparatus of the present invention, since the first and second engagement parts are of a hook type where their shapes are mutually combined to form a hook, the first and second engagement parts can be prevented from being separated from each other after the ramp is molded.

The information recording disk apparatus of the present invention employs the ramp having a less amount of deformation in the front end edge of the guiding part, whereby the undesirable contact between the magnetic head and recording disk when the suspension arm is loaded or unloaded can be reduced.

What is claimed is:

1. A ramp for use in an information recording disk apparatus having a plurality of suspension arms, the ramp comprising:

at least two guiding parts individually formed for each suspension arm and made of a polymeric material having a small friction coefficient for guiding each suspension arm by sliding into an accommodation zone; and a guide supporting member made of a material having a thermal expansion coefficient smaller than that of the polymeric material of the at least two guiding parts for supporting each guiding part at a predetermined position, wherein the guide supporting member is made of a metallic plate, wherein the guide supporting member has first engagement parts, the first engagement parts being located in zones to be contacted with the associated guiding parts and not in contact with associated recording disks, the first engagement parts being engaged with the associated guiding parts at such positions that distances to front end edges of the guiding parts from said first engagement parts become shortest, each of the at least two guiding parts has a second engagement part provided with an anti-lean support part so that opposing support surfaces of the guiding parts are not mutually linked, and when the second engagement part is engaged in the associated first engagement part, the guiding part guides the suspension arm at a suitable position; and wherein no bridging means made of the same material as the at least two guiding parts for linking the opposing support surfaces of the at least two guiding parts is provided at least between the front end edges of the at least two guiding parts and the second engagement parts.

2. The ramp as set forth in claim 1, wherein the front end edge of the at least two guiding parts is set to have such a minimum width that causes the suspension arms not to be brought into contact with the guide supporting members, the guide supporting member is engaged with the at least two guiding parts at such an angle that the suspension arms are not contacted therewith, or is made in the form of an arc so that the suspension arms are not contacted therewith and are engaged with the at least two guiding parts.

3. The ramp as set forth in claim 1, wherein the guide supporting member is provided with a comb shape in a part other than escape parts of the recording disks, the comb being extended to the front and edges of the at least two guiding parts.

4. An information recording disk apparatus having the ramp as set forth in claim 1, comprising:

a rotary actuator assembly linked with one of the suspension arms;

a plurality of laminated magnetic disks;

the ramp disposed in the vicinity of the magnetic disks for retracting the suspension arm; and a housing in which the actuator assembly, magnetic disks and ramp are accommodated.

5. A ramp for use in an information recording disk apparatus having a plurality of suspension arms, the ramp comprising:

at least two guiding parts individually formed for each suspension arm and made of a polymeric material having a small friction coefficient for guiding each suspension arm by sliding into an accommodation zone; and a guide supporting member made of a material having a thermal expansion coefficient smaller than that of the polymeric material of the at least two guiding parts for supporting each guiding part at a predetermined position, wherein the guide supporting member is made of a polymeric material;

wherein the guide supporting member has first engagement parts, the first engagement parts being located in zones to be contacted with the associated guiding parts and not in contact with associated recording disks, the first engagement parts being engaged with the associated guiding parts at such positions that distances to front end edges of the guiding parts from said first engagement parts become shortest, each of the at least two guiding parts has a second engagement part, and when the second engagement part is engaged in the associated first engagement part, the guiding part guides the suspension arm at a suitable position;

wherein no bridging means made of the same material as the at least two guiding parts for linking opposing support surfaces of each of the at least two guiding parts is provided at least between the front end edges of the at least two guiding parts and the second engagement parts; and wherein the guide supporting member has guide gaps of such a shape as to fill gaps between the at least two guiding parts on their sides where the suspension arms are not slid.

6. The ramp as set forth in claim 5, wherein the first engagement parts are provided in the guide supporting member corresponding to the guide gaps, and the second engagement parts are provided to the at least two guiding parts at a position opposed to the first engagement parts.

7. The ramp as set forth in claim 6, wherein the first and second engagement parts are of a hook type where the first and second engagement parts are combined into a hook.

* * * * *